United States Patent
Lubbers et al.

(10) Patent No.: US 6,216,457 B1
(45) Date of Patent: Apr. 17, 2001

(54) ELECTRONICALLY CONTROLLED HYDRAULIC BRAKE BOOST PRESSURE CONTROL SYSTEM

(75) Inventors: Mark D. Lubbers; Richard J. Barron; Harry A. Hunnicutt, all of Ann Arbor; Louis S. Tang, Novi; Gregory J. Krawczyk, Livonia, all of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/191,965

(22) Filed: Nov. 13, 1998

Related U.S. Application Data

(63) Continuation of application No. PCT/US97/07640, filed on May 14, 1997.
(60) Provisional application No. 60/017,740, filed on May 15, 1996.

(51) Int. Cl.$^7$ .................................................. B60T 13/00
(52) U.S. Cl. .......................... 60/547.2; 60/547.3; 60/566
(58) Field of Search .......................... 60/417, 418, 547.2, 60/547.3, 556

(56) References Cited

U.S. PATENT DOCUMENTS

| | | | |
|---|---|---|---|
| 2,472,695 | * 6/1949 | Chouings | 60/418 |
| 2,956,405 | 10/1960 | Spalding et al. | 60/547.3 |
| 3,896,620 | 7/1975 | Flory | 60/547.2 |
| 3,978,667 | 9/1976 | Ohara | 60/547.2 |
| 4,014,171 | 3/1977 | Kobashi | 60/547.2 |
| 4,285,198 | 8/1981 | Budecker | 60/547.2 |
| 4,620,750 | 11/1986 | Leiber | 60/545 |
| 4,967,643 | 11/1990 | Siegel | 60/547.1 |
| 5,924,284 | 7/1999 | Shimada et al. | |

OTHER PUBLICATIONS

Mico, Inc. Service Manual, "Full Power Hydraulic Power Brake Valve" (Mico, Inc. Form No. 81–460–044), published Apr. 1984.
Mico, Inc. Product Catalog, "Brake Actuators" (Mico, Inc. Form No. 84–460–005), published Sep. 1984.
Bendix Automotice Control Systems Group, "Bendix Hydro–Boost Power Brake" Technical Data Brochure, Dec. 1976.
Schematic Diagram showing a Charging Valve Assembly, Mico, Inc., North Mankato, Minnesota, published before Sep. 4, 1997.

* cited by examiner

Primary Examiner—F. Daniel Lopez
(74) Attorney, Agent, or Firm—MacMillan, Sobanski & Todd, LLC

(57) ABSTRACT

A vehicle hydraulic system is disclosed comprising a hydraulic fluid reservoir; a pressure force supplying pressurized hydraulic fluid to a discharge header; a fluid conduit between the discharge header and the reservoir; a back pressure valve operative in the fluid conduit to maintain a desired pressure in the discharge header; and a vehicle braking system having a hydraulically operated boost piston assembly for supplementing a force exerted by a vehicle operator to operate brakes of the vehicle braking system. The system further includes a boost pressure control valve responsive to an input from the vehicle operator for selectively directing pressured hydraulic fluid from the discharge header to the boost piston assembly and venting hydraulic fluid from the boost piston assembly to the reservoir.

17 Claims, 19 Drawing Sheets

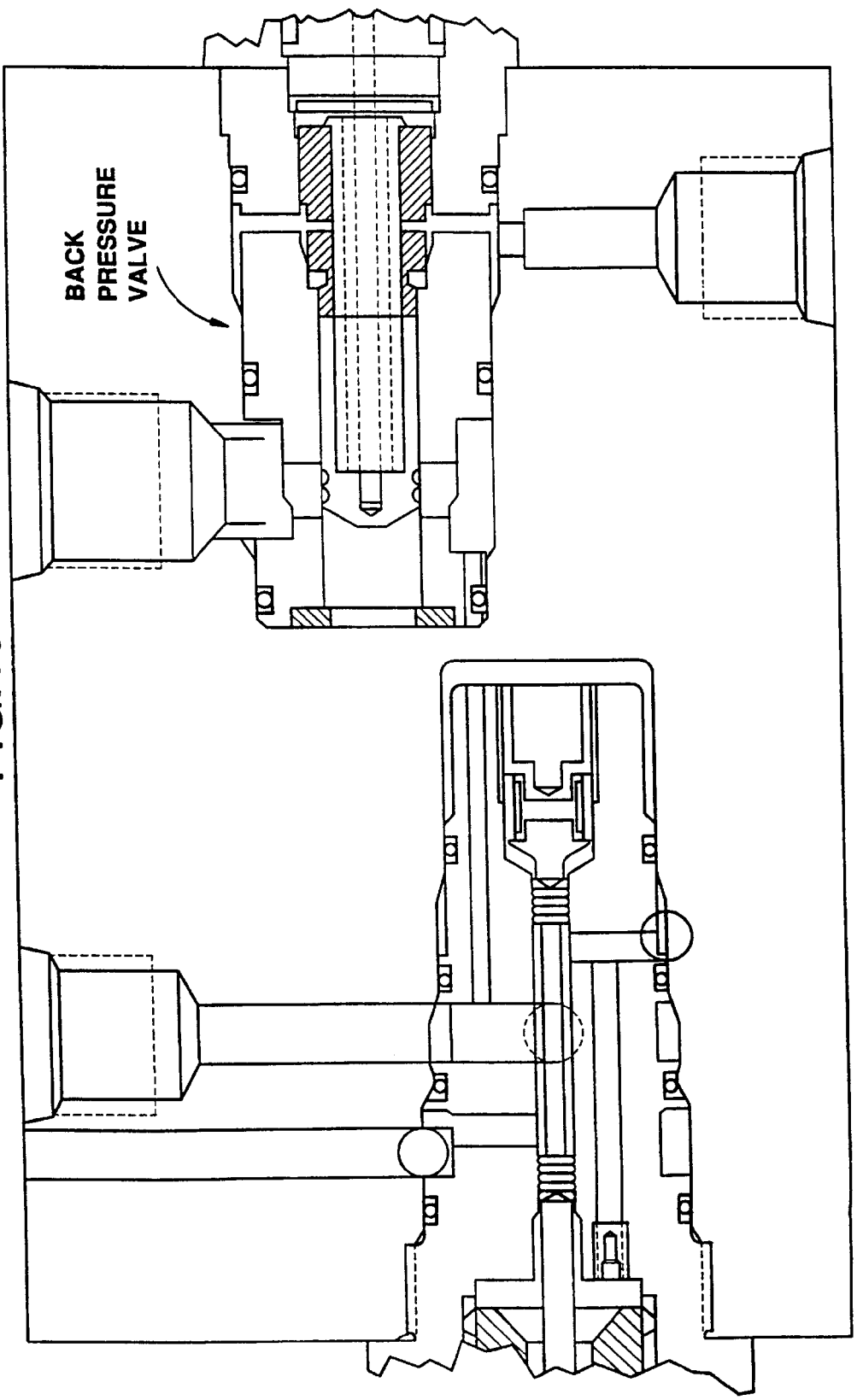

PROPORTIONAL VALVE FOR PILOTED SYSTEM

ELECTRONICALLY CONTROLLED HYDRAULIC BRAKE BOOST PRESSURE CONTROL SYSTEM

CROSS REFERENCE TO RELATED APPLICATIONS

This application is a continuation of International Application No. PCT/US97/07640 filed May 14, 1997, which claims priority to U.S. Provisional Application No. 60/017,740 filed May 15, 1996.

BACKGROUND OF THE INVENTION

This invention relates in general to brake systems for motor vehicles, and in particular to fluid pressure operated boosters for vehicle braking systems.

Conventional vehicle brake systems are constructed such that the braking force developed by the system is generally proportional to the force applied by the vehicle operator on a vehicle brake pedal. The pedal is linked to a piston in a master cylinder which moves to pressurize the fluid of the brake system, and thus actuate the individual wheel brakes. Generally, in order to provide a sufficiently high pressure to operate the wheel brakes without requiring an excessive effort by the operator, most vehicles include a "boosted" power brake system wherein the force applied to the brake pedal by the operator is amplified or boosted before being applied to the master cylinder. In automobiles and light trucks, this is typically accomplished by incorporating either a vacuum or hydraulically operated boost piston assembly between the brake pedal and the master cylinder.

Vacuum operated boost piston assemblies utilize the pressure differences between the atmosphere and the vehicle's engine vacuum to develop a force across a boost piston or diaphragm. The force developed by this differential pressure across the boost piston may be many times that which could be developed by the operator by pressing against the pedal, and is applied to the piston of the master cylinder to actuate the brakes.

Hydraulic boost piston assemblies utilize the pressure developed by a hydraulic system, such as the vehicle's power steering system, to apply a force to a boost piston. The force applied by the hydraulic system to the boost piston, like the vacuum boost system may be many times that which could be applied by the operator of the vehicle without a boost system. The increase force applied to the piston of the master cylinder generates higher braking system operating pressures for a given pedal force input.

SUMMARY OF THE INVENTION

Briefly, the present invention, in a first embodiment thereof, comprises a vehicle hydraulic system including: a hydraulic fluid reservoir; a pressure source supplying pressurized hydraulic fluid to a discharge header; a fluid conduit between the discharge header and the reservoir; a back pressure valve operative in the fluid conduit to maintain a desired pressure in the discharge header; a vehicle braking system having a hydraulically operated boost piston assembly for supplementing a force exerted by a vehicle operator to operate brakes of the vehicle braking system; and a boost pressure control valve responsive to an input signal from the vehicle operator for selectively directing pressurized hydraulic fluid from the discharge header to the boost piston assembly and venting hydraulic fluid from the boost piston assembly to the reservoir.

In a further aspect of this embodiment, the boost pressure control valve may include a housing defining a plurality of ports and a spool movable relative to the housing for selectively directing pressurized hydraulic fluid from the discharge header to the boost piston assembly through the ports and venting hydraulic fluid from the boost piston assembly to the reservoir through the ports, with the spool moving relative to the housing in response to the input signal.

In a further aspect of this embodiment, the input signal to the boost pressure control valve may be a pressure signal generated by a pilot valve, wherein the pilot valve selectively applies pressurized hydraulic fluid from the discharge header to a portion of the spool and vents hydraulic fluid from the portion of the spool to the reservoir to cause the spool to move relative to the housing in response to an operator input to the pilot valve.

In yet a further aspect of this first embodiment of the present invention, the input signal to the boost pressure control valve may comprise an electrical signal to a solenoid having an armature operatively coupled to the spool, such that the forces generated by the electric solenoid are balanced against forces generated by the boost pressure.

In yet a further aspect of the present invention, a second fluid conduit is included for carrying hydraulic fluid therein between the boost pressure control valve and the boost piston assembly, and wherein the back pressure valve controls pressure in the discharge header in response to the pressure of the hydraulic fluid in the second fluid conduit between the boost pressure control valve, and the boost piston assembly.

In yet a further embodiment of the present invention, there is disclosed a vehicle hydraulic system comprising a hydraulic fluid reservoir; a first fluid conduit in fluid communication with the reservoir; a pressure source supplying pressurized hydraulic fluid to the first fluid conduit; a vehicle braking system having a hydraulically operated boost piston assembly for supplementing a force exerted by a vehicle operator to operate brakes of the vehicle braking system; and a boost pressure control valve responsive to an input signal from the vehicle operator for selectively directing pressurized hydraulic fluid at a desired pressure from the first fluid conduit via a boost conduit to the boost piston assembly and venting hydraulic fluid from the boost piston assembly to the reservoir. This embodiment further includes a power steering valve assembly positioned in the first fluid conduit between the reservoir and the boost pressure control valve, wherein operation of the power steering valve assembly generates a back pressure in the first fluid conduit which can be directed to the vehicle braking system by the boost pressure control valve. This embodiment further includes a back pressure valve positioned in the first fluid conduit which can be selectively at least partially closed such that the back pressure valve and the power steering valve assembly, in combination with the pressure source, pressurize the first fluid conduit to a pressure greater than the pressure in the boost conduit in response to driver input.

In yet a further aspect of this embodiment, the system may include an accumulator; and an accumulator valve assembly positioned in the first fluid conduit between the back pressure valve and the boost pressure control valve to hydraulically connect the accumulator to the first fluid conduit when a difference in pressure between the first fluid conduit and the boost conduit drops below a first predetermined value.

In yet a further aspect of this embodiment, the system may include a charging valve assembly connected to the accumulator to cause the accumulator to be automatically charged when hydraulic pressure representative of pressure in the accumulator drops below a second predetermined value.

In yet a further aspect of the present invention, there is disclosed a method for supplying hydraulic fluid to a vehicle braking system comprising: the steps of: supplying pressurized hydraulic fluid to a discharge header; maintaining a desired pressure in the discharge header; supplementing via a boost piston assembly a force exerted by a vehicle operator to operate brakes of the vehicle braking system; and selectively directing a boost pressure, comprising pressurized hydraulic fluid from the discharge header via a boost conduit, to the boost piston assembly and venting hydraulic fluid from the boost piston assembly in response to an input signal.

In a further aspect of this inventive method, the step of selectively directing pressurized hydraulic fluid comprises the step of applying pressurized hydraulic fluid to the boost piston assembly in accordance with a force, F, generated by the input signal and applied to a spool within a boost pressure control valve, the force F being in opposition at least to a force generated within the boost pressure control valve by the boost pressure such that the balance of these forces determines whether the pressurized hydraulic fluid is directed to the boost piston assembly or vented from the boost piston assembly.

In a yet further embodiment of this method, the maintaining step comprises the step of maintaining the pressure in the discharge header to a value above the boost pressure directed to the boost piston assembly.

In a yet further aspect of this invention, the inventive method includes the step of adding hydraulic pressure via an accumulator conduit to the discharge header when a difference in pressure between the discharge header and the boost conduit drops below a first predetermined value.

In yet a further embodiment of the invention, the method includes the step of automatically charging the accumulator conduit when the hydraulic pressure in the accumulator conduit drops below a second predetermined value.

In yet a further embodiment of the present invention, a vehicle hydraulic system is disclosed comprising: a pressure source supplying pressurized hydraulic fluid to a pressure supply line; an accumulator hydraulically connected to the pressure supply line; and a charging valve assembly connected to the accumulator to cause the accumulator to be automatically charged when hydraulic pressure representative of the pressure in the accumulator drops below a predetermined value.

In a further aspect of this embodiment, a back pressure valve assembly is provided, wherein operation of the back pressure valve assembly, under the control of the charging valve assembly, generates a back pressure for charging the accumulator.

In a further aspect of this embodiment, an accumulator valve assembly is provided which hydraulically connects the accumulator to the pressure supply line and provides back pressure through the accumulator valve to charge the accumulator.

In a yet further aspect of this embodiment, the charging valve assembly may comprise a charging valve body with a channel therethrough ending in a first and second openings, with the first opening hydraulically connected to the accumulator, and with the second opening hydraulically connected to a vent. A first closure device is biased to seat in the first opening, and a second closure device is biased to seat in the second opening, and with the second closure device connected to the first closure device via a rod extending through the channel which is longer than the channel and smaller in cross-section than the channel. The back pressure valve assembly includes a control chamber, that may be pressurized to throttle the back pressure valve assembly to generate the back pressure. A hydraulic conduit hydraulically connects the channel of the charging valve body to the control chamber of the back pressure valve assembly.

In a yet further aspect of this embodiment, the accumulator valve may comprise an accumulator valve body with a channel therethrough ending in a first and second openings, with a first chamber at the first opening of the channel and with a second chamber at the second opening of the channel, with the second chamber hydraulically connected to the accumulator, and with the channel hydraulically connected to receive the back pressure and also hydraulically connected to the discharge header. A first device is disposed in the first chamber, and a closure device is disposed in the second chamber and connected to the first device via a rod which extends through the channel and which is larger than the second channel and smaller in cross-section than the channel. The first device is biased to open the closure device.

In a yet further embodiment of the present invention, a vehicle hydraulic system is disclosed comprising: a hydraulic fluid reservoir; a pressure source supplying pressurized hydraulic fluid to a pressure supply conduit; a second fluid conduit between the pressure supply conduit and the reservoir; and a back pressure valve operative in the second fluid conduit to maintain a desired back pressure in the pressure supply conduit. This embodiment further includes a vehicle braking system having a hydraulically operated boost piston assembly for supplementing a force exerted by a vehicle operator to operate brakes of the vehicle braking system; and a boost pressure control valve responsive to an input signal from the vehicle operator for selectively directing pressurized hydraulic fluid from the pressure supply conduit to a boost conduit to the boost piston assembly and venting hydraulic fluid from the boost piston assembly to the reservoir. This embodiment further includes an accumulator; and an accumulator valve assembly operative in the pressure supply line to hydraulically connect the accumulator to the pressure supply line when a difference in pressure between the pressure supply line and the boost conduit drops below a first predetermined value.

In a further aspect of this embodiment, a charging valve assembly is connected to the accumulator to cause the accumulator to be automatically charged when hydraulic pressure representative of pressure in the accumulator drops below a second predetermined value.

In a yet further aspect of this embodiment, the back pressure valve may be hydraulically connected to the charging valve assembly and controlled by hydraulic pressure therefrom to generate a desired level of back pressure. The accumulator valve assembly may then be configured to hydraulically connect the back pressure to the accumulator when the hydraulic pressure representative of pressure in the accumulator drops below the second predetermined value.

DETAILED DESCRIPTION OF THE PREFERRED EMBODIMENT

Figure 1:
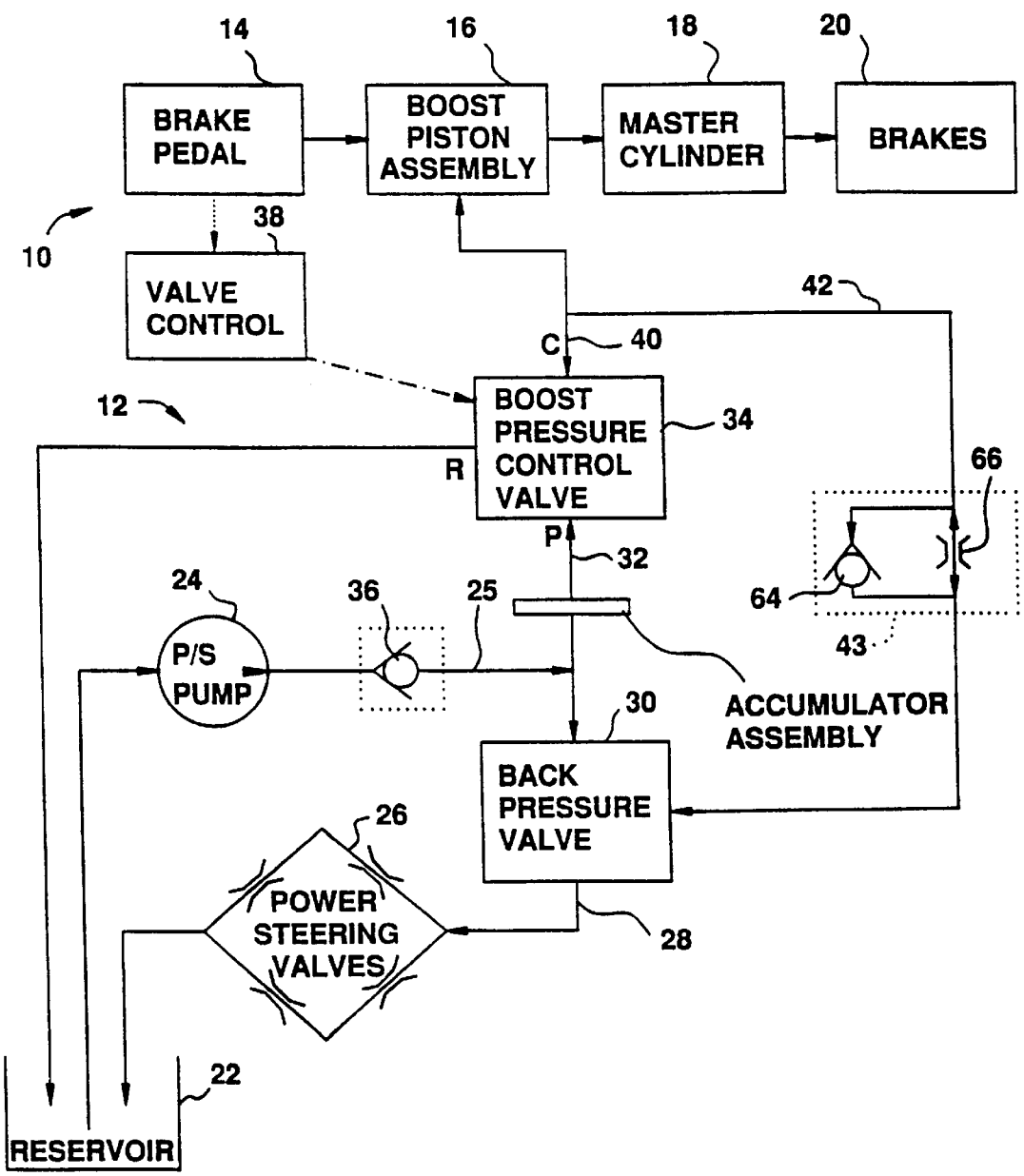
FIG. 1 is a schematic block diagram of a first embodiment of the present invention.

Referring to FIG. 1, a schematic view is shown of portions of the brake system 10 and power steering system 12 of a motor vehicle. The brake system 10 includes a brake pedal 14 operable by the operator of the vehicle to control the operation of the brake system 10. The brake pedal 14 is operatively connected to a boost piston assembly 16, which hydraulically increases the force exerted by the operator on the brake pedal. The boost piston assembly 16 applies this increased force to a piston (not shown) within a conventional master cylinder 18. The master cylinder controls the operation of the vehicle brakes 20 in a conventional manner.

The power steering system 12 includes a reservoir 22 of power steering hydraulic fluid. A power steering pump 24 pumps hydraulic fluid out of the reservoir 22 through a pump outlet line 25. From the pump outlet line 25, the hydraulic fluid is directed to a group of conventional power steering valves 26 through a fluid conduit 28. The hydraulic fluid flowing through the fluid conduit 28 passes through a back pressure valve 30, which will be discussed in detail below. Between the pump 24 and the back pressure valve 30, a discharge header or pressure supply conduit fluid conduit 32 taps into the fluid conduit 28, to permit flow from the pump 24 to a valve 34. Optionally, a pump discharge check valve 36 may be provided in the pump outlet line 25, for a purpose which will be described below.

The boost pressure control valve 34 is signaled in response to a valve control 38. The valve control 38 may physically operate the boost pressure control valve 34 by controlling the operation of for example, a direct acting solenoid, or a pilot valve which hydraulically moves the boost pressure control valve 34. The valve control 38 may also be embodied as a mechanical link to the pedal 14. As will be further described below, the valve control 38 may also use a combination of these control configurations.

The boost pressure control valve 34 is controlled to deliver hydraulic fluid at a desired boost pressure to the boost piston assembly 16 through a fluid conduit 40 when increasing brake force is desired, and to vent off excess pressure from the boost piston assembly 16 to the reservoir 22 when decreased brake force is required. A fluid conduit 42 taps off of the fluid conduit 40 to feed the boost pressure to the back pressure valve 30. Optionally, as will be discussed, a pressure sustaining valve arrangement 43 can be installed in the fluid conduit 42.

Figure 2:
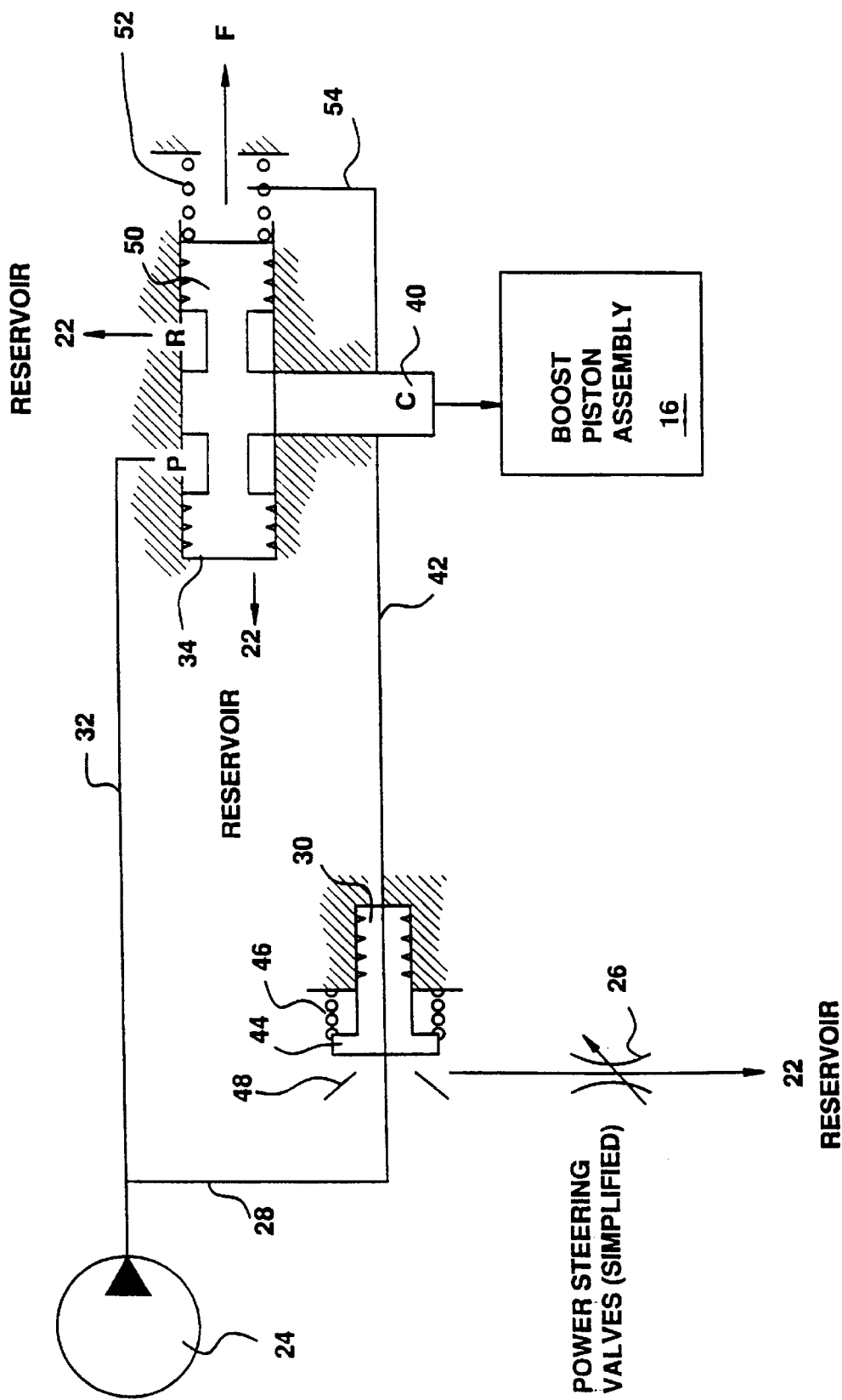
FIG. 2 is a schematic block diagram of a further embodiment of the present invention.

FIG. 2 is a detailed schematic view of the back pressure valve 30 and the boost pressure control valve 34. The boost pressure control valve 34 is a spool valve having a port P connected to the fluid conduit 32 from the pump 24; a port R which is vented to the reservoir 22; and a control port C which is in fluid communication with the boost piston assembly 16 via the fluid conduit 40 and the back pressure valve 30 via the fluid conduit 42. The boost pressure control valve 34 will be discussed in greater detail below.

The back pressure valve 30 includes a spring loaded valve disk 44 which is urged by a bias spring 46 to seal against a valve seat 48. The fluid conduit 42 supplies any boost pressure developed by the boost pressure control valve 34 to the valve disk 44 in a manner that tends to also cause the valve disk 44 to close against the valve seat 48. As hydraulic fluid from the pump 24 flows toward the power steering valve 26, the combined action of the bias spring 46 and any pressure in the fluid conduit 42 causes the back pressure valve 30 to create a restriction, and thus a back pressure. This back pressure is a function of the force with which the valve disk 44 is urged toward the valve seat 48, and is slightly greater than the pressure in conduit 42 and the port C. This back pressure causes the discharge pressure of the pump 24 to rise. The back pressure valve 30 can be relatively large compared to the boost pressure control valve 34, so that the back pressure valve 30 given an acceptably low pump 24 discharge pressure (when brake boost and power steering are not required) for a low load on the pump 24, and on the vehicle's engine (not shown) which drives the pump 24.

When the vehicle is steered, the power steering valves 26 operate, causing the discharge pressure of the pump 24 to rise. This in turn causes the pressure at the port P of the boost pressure control valve 34 to rise. When the pressure at the port P rises above a desired boost pressure, the back pressure valve 30 opens fully thereby subjecting the boost pressure control valve 34 to the power steering upstream pressure. Thus, the back pressure valve 30 acts to use the back pressure generated by the power steering valve 26 for supplying the boost pressure control valve 34 with pressure when the back pressure from the power steering valves 26 is adequate to supply the demanded boost pressure.

When the back pressure from the power steering valves 26 is less than the pressure required for boost, the bias spring 46 causes the back pressure valve 30 to close sufficiently to maintain pressure at port P slightly higher than the pressure at port C, as required to supply the pressure control valve 34.

As indicated above, the boost pressure control valve 34 is a spool valve. The boost pressure control valve 34 has a spool 50 which proportions flow to port C from port P or from port C to port R. As shown in FIG. 2, the spool 50 is shown in a mid position, in which the port C is nominally isolated from the ports P and R. As also indicated above, the valve control 38 sets the desired output pressure of the boost pressure control valve 34. In the embodiment shown in FIG. 2, the arrow marked F represents a force exerted by a proportional pull solenoid on the spool 50 when energized. The pressure at the port C is fed through a fluid conduit 54 to act on the right end of the spool 50. The left end of the spool 50 is vented to the reservoir 22. The force F tends to move the spool 50 rightward as viewed in FIG. 2, compressing a spring 52 and providing communication between the ports P and, C of the boost pressure control valve 34. If the excitation of the solenoid is increased, the force F will increase, and the spool 50 will be moved rightward to allow fluid to flow from the port P to the port C. Similarly, if the excitation of the solenoid is decreased, the force F will decrease, and the spool 50 will be moved leftward under the urging, of the spring 52 and pressure from the port C through the conduit 54 to the right end of the spool 50. This allows fluid from the port C to be vented to the reservoir 22 through the port R until the pressure has decreased in port C such that all the forces balance out, and the spool 50 returns to the center position.

If the pressure at the port C channeled through the conduit 54 generates a force on the right end of the spool 50 which is less than the algebraic sum of the force F and the bias of the spring 52, the spool 50 moves rightward to admit pressurized fluid from the port P to the port C. This increases the pressure at the port C, and thus increases the boost pressure applied to the boost piston assembly 16 and the pressure fed back through the fluid-conduit 42 to the back pressure valve 30. If the pressure in the conduit 54 generates a force on the right end of the spool 50 which is less than the algebraic sum of the force F and the bias of the spring 52, the spool 50 moves leftward to vent the port C to the port R, decreasing the pressure at the port C. Thus, by varying the force F, the boost pressure at the port C can be controlled. The valve control 38 controls the energization of the proportional solenoid to achieve a desired boost pressure at the port C. As described above, the valve 30 acts to make the port P pressure slightly higher than that of the port C. Note that the bias of the spring 52 causes the port C to be open to the port R when no force, apart from the spring bias, is applied to spool 50.

As the boost pressure at the port C rises, it is fed back to the back pressure valve 30 to cause P to increase, ramping up the pressure at the port P slightly above the boost pressure at the port C until balance between solenoid force, the bias of the spring 52 and force exerted by the boost pressure acting on the right end of the spool 50 is restored.

As the force F is decreased, the spool 50 moves leftward under the influence of the spring 52, venting the port C to the port R, lowering the pressure to the boost piston assembly 16 and the pressure fed back to the back pressure valve 30, causing valve 30 to open, thereby decreasing the back pressure caused by the back pressure valve 30 and causing the pressure at the port P to follow, maintaining the pressure at the port P slightly above the pressure at the port C.

When no braking is required, the solenoid is deenergized, and the port C is fully vented to the reservoir 22 through the port R because of the bias from spring 52, thus causing the boost pressure to go to zero. In this condition, the back pressure caused by the power steering valves 26, when the power steering valves 26 are all open (i.e., when steering straight ahead), will just overcome the bias of the spring 46 of the back pressure valve 30, opening the back pressure valve 30 fully, so a minimal amount of extra back pressure is applied to the pump 24. In this manner, the hydraulic boost portion of the brake system 10 will have a minimal impact on the fuel economy of the vehicle.

Figure 3:
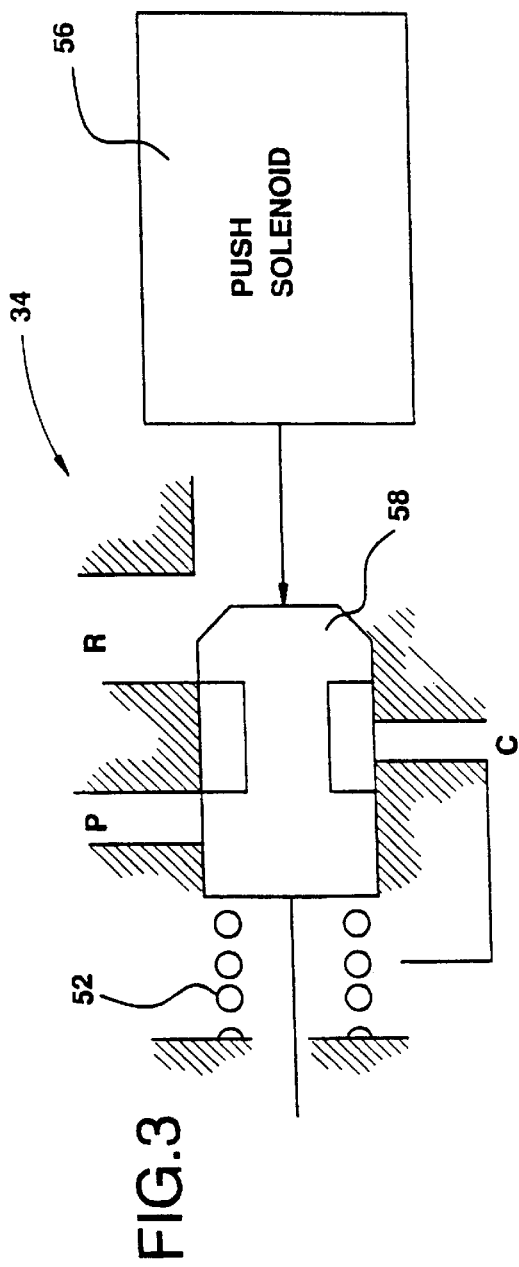
FIG. 3 is a schematic block diagram of an alternative embodiment for the boost pressure control valve shown in FIG. 2.

FIG. 3 shows another embodiment of the boost pressure control valve 34. In this case, the bias spring 52 is disposed on the left end of the spool 58, which is in fluid communication with the port C so that the force of the spring 52 and the force exerted by the boost pressure of the hydraulic fluid at the port C exert a force opposing the force of a solenoid, shown here as a push solenoid 56. The right end of the spool 58 is vented to the port R. The null of the boost pressure control valve 34 is set by the positions of the ports P and R, rather than the at the centerline of the port C, as was the case of the embodiment shown in FIG. 2. The push solenoid 56 is shown here as an alternative to a pull solenoid and is another of the actuation options which may be used in either of the embodiments shown in FIGS. 2 or 3.

Figure 4:
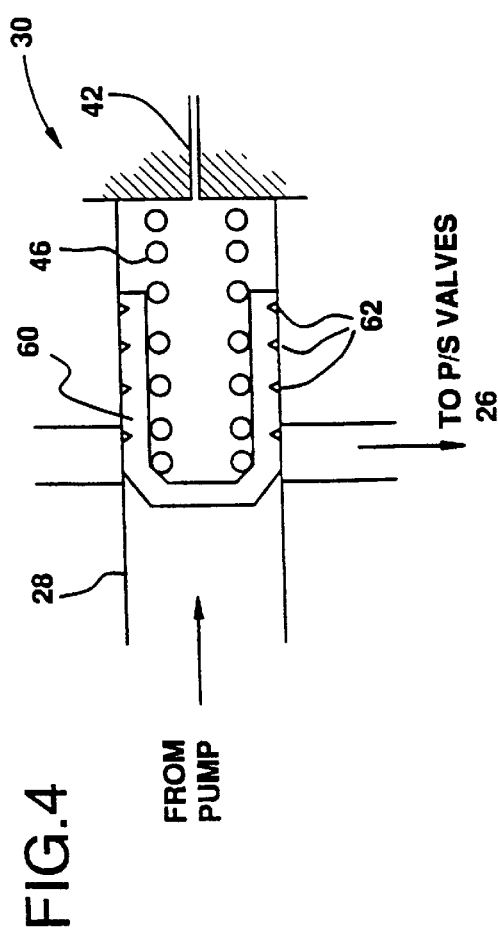
FIG. 4 discloses an alternative embodiment for the back pressure valve shown in FIG. 2.

FIG. 4 shows another embodiment of the back pressure valve 30, in which, instead of the valve disk 44 shown in FIG. 2, a cup shaped piston 60 generates pressure in line 28. Preferably, the piston 60 is provided with a plurality of pressure equalizing grooves 62, which reduce the side loads on piston 60, allowing the piston 60 to move freely. The flow versus travel characteristics of this embodiment of the back pressure valve 30 can be varied, by changing the shape of the ports exiting the valve 30 to the lines leading to the power steering valve 26.

Figure 5:
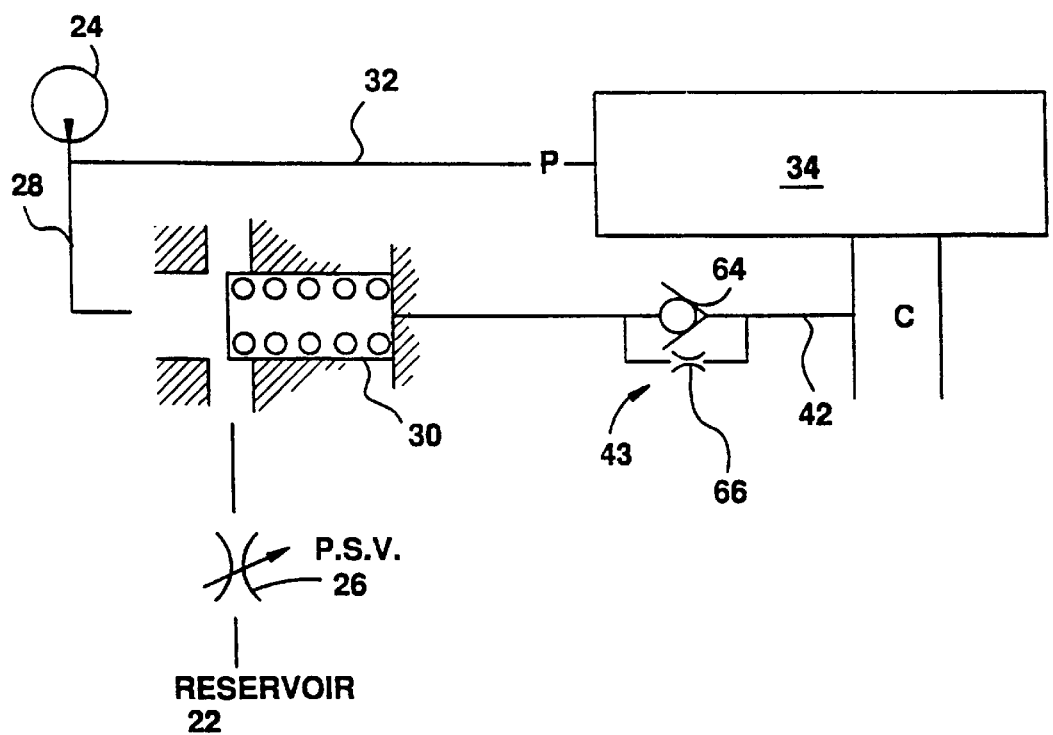
FIG. 5 is a schematic block diagram of a further aspect of the present invention.

For reapplication of boost within a short space of time it may be desirable to limit the rate at which the back pressure valve 30 unloads the pump 24. For example, this may be desirable for traction control. As indicated above, a pressure sustaining valve arrangement 43 may optionally be provided in the fluid 42. As illustrated schematically in FIGS. 1 and 5, one such pressure sustaining valve arrangement 43 can be realized using a check valve 64 in parallel with an orifice 66 in the line 42 between the port C and the back pressure control valve 30. The check valve 64 is oriented so that the boost pressure at the port C can be rapidly applied to the back pressure valve 30 through the check valve 64. This pressure is sustained on the back pressure valve 30 for a short duration after boost pressure at the port C drops, because the pressure is prevented from being relieved back through the check valve 64, and will be more slowly relieved through the orifice 66.

Having determined the rate of pressure change at the port C when dumping to the reservoir 22 through the port R, the size of the orifice 66 could be selected to limit the rate of decrease of the pressure at the port to a rate similar to that at which the valves 30 and 34 cause pressure at the port P to rise.

Note that the boost pressure control valve 34 of this embodiment may be manufactured at relatively low cost, since it requires only one 3-way spool, and the configuration shown would allow a single port, port C, to be drilled and honed with matching lands ground on the spool 50. This configuration allows required tolerances to be achieved relatively easily by precisely sizing the diameter of the port C relative to the axial dimension of the land. The tolerance stack-ups are substantially less for the spool valve design of the present invention than for a spool design which uses a single land and two drilled ports. The precise centering of holes is a difficult machining operation with respect to keeping tight centering tolerances than matching a diameter between two radially extending cylindrical lands. Furthermore, the fluid flows to the boost piston assembly 16 from the boost pressure control valve 34 are small compared with the flow of the power steering system 12, so only a relatively small boost pressure control valve 34 and associated solenoid are required. However, any suitable arrangement may be used to practice this invention, including back pressure valves 30 configured with any workable number of ports or lands.

The size of the boost pressure control valve 34 of the illustrated embodiment can also be limited due to the relatively small travel of the spool 50. Balance of the spool 50 always will occur within the "blocked load" pressure gain region of the spool 50. This is believed to typically have repeatability within about 0.03 mm. Therefore, flow will be proportional to the excitation current of the solenoid with a simple solenoid design.

When the back pressure valve 30 is controlling pressure at the port P, the apply rate of boost pressure to the brakes 20 will be approximately constant. The apply rate of boost pressure in this condition will not be a function of the pump discharge pressure or the boost pressure since the back pressure valve 30 maintains a constant differential pressure from the port P to the port C.

Thus, in the arrangement shown in FIG. 1, two valves are used to develop the boost pressure applied to the boost piston assembly 16, the back pressure valve 30, which is controlled by the boost-pressure, and the boost pressure control valve 34, controlled by the valve control 38. This allows each valve to be separately designed for their different flow and response requirements (as opposed to one more complex valve doing both functions). The brake system 10 can, if required, use all the back pressure from the power steering system 12 whilst still making pressure available for steering assist. As indicated above, the boost pressure control valve 34 can be configured to receive a setpoint from an electrically controlled force, a mechanical force input, or a pilot pressure as discussed below, or any combination thereof.

Figure 9:
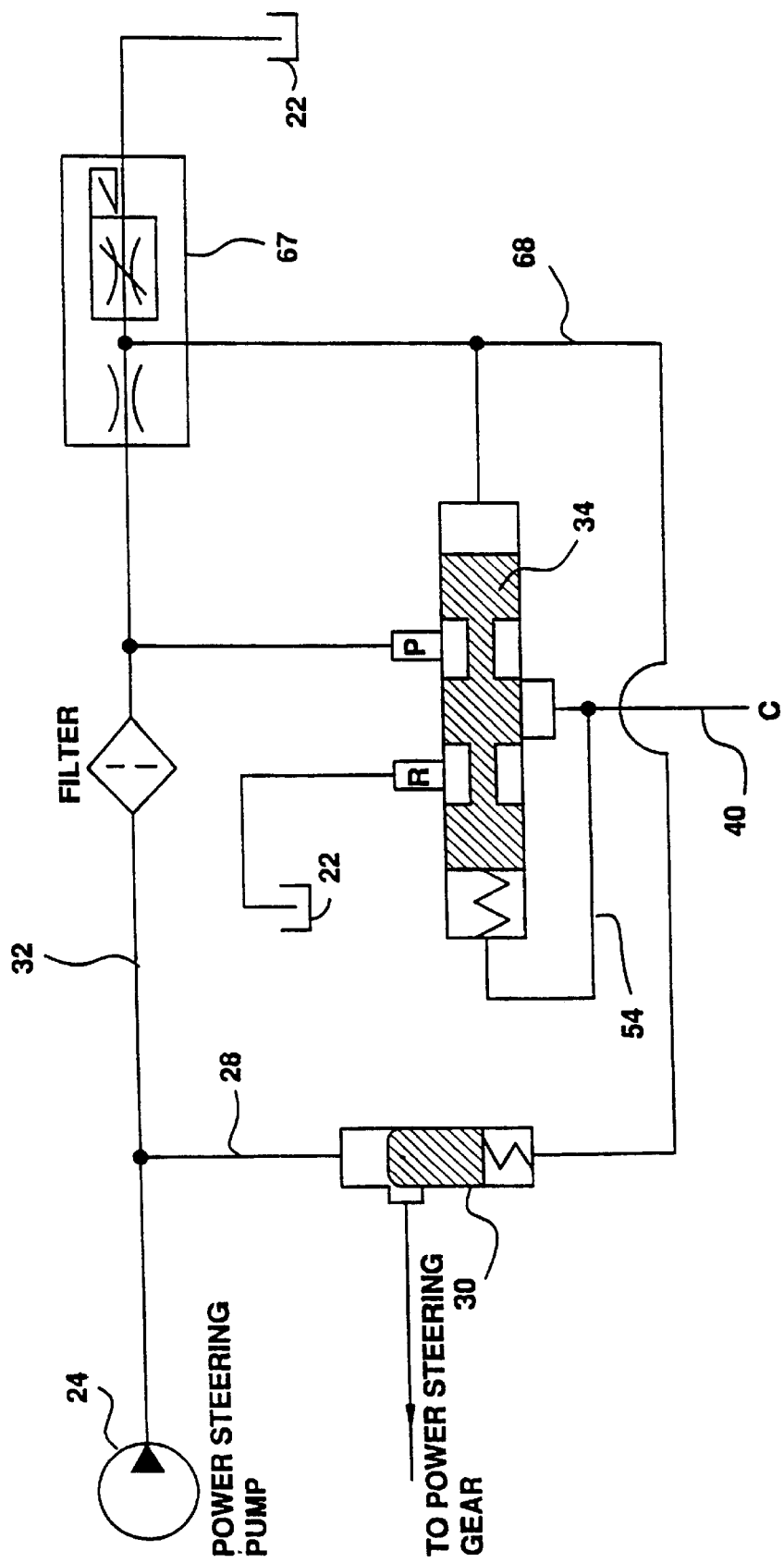
FIG. 9 is a schematic block diagram of a yet further embodiment of the present invention.

An alternate embodiment of the brake system 10 is shown in FIG. 9 in which a proportioned pilot valve 67 is used instead of a direct acting solenoid to activate the boost pressure control valve 34. The boost pressure control valve 34 is activated by the pilot valve 67 which is controlled by the valve control 38. Instead of pressure in the line 42 (FIG. 1) activating the back pressure valve 30, the back pressure valve 30 is activated by the pilot pressure from the pilot valve 67 directed through a fluid conduit 68. Because of this, the pressure build up in line 28 and 32 is not dependent on the rate of pressure rise at port C, but on the pressure developed by the pilot valve 67 directed into the conduit 68. This can reduce the system's response time.

As indicated above and shown in FIG. 1, a check valve 36 may be provided in the discharge of the pump 24. In the event of a pump failure, or other failure which results in a decrease in discharge pressure from the pump 24, the back pressure valve 30 will shut in an attempt to maintain a constant differential pressure between the port P and the port C, preventing flow or depressurization of the hydraulic fluid through the back pressure valve 30. The check valve 36 will act to contain the hydraulic fluid and pressure in the fluid conduit 32 and the fluid conduit 28 upstream of the back pressure valve 30, preventing back flow and depressurization through the pump 24. Thus the check valve 36 and the back pressure valve 30 cooperate to limit the rate of the loss of boost pressure under conditions such as pump failure or engine stall.

Figure 6:
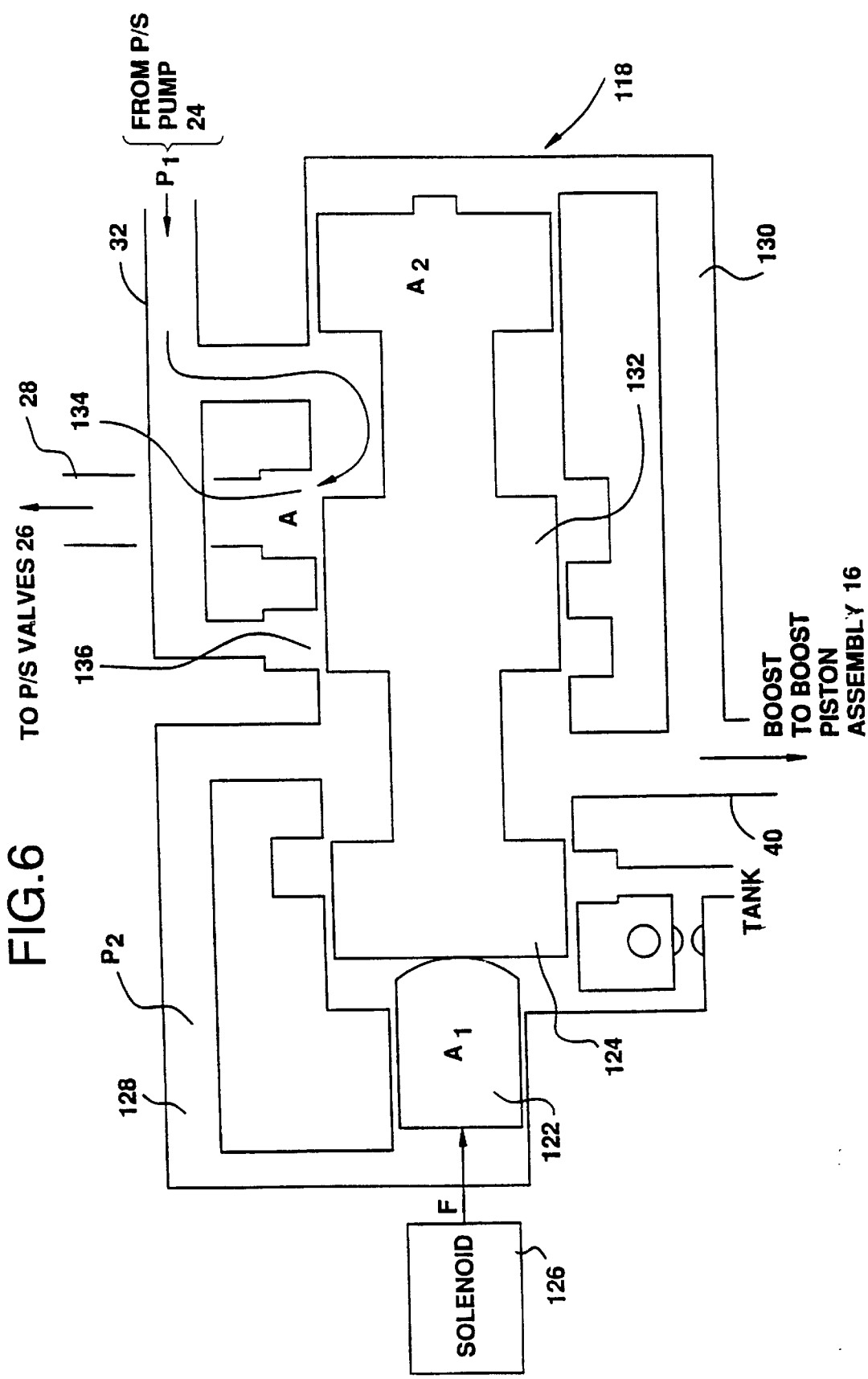
FIG. 6 is a block diagram of a further embodiment of the present invention.
Figure 7:
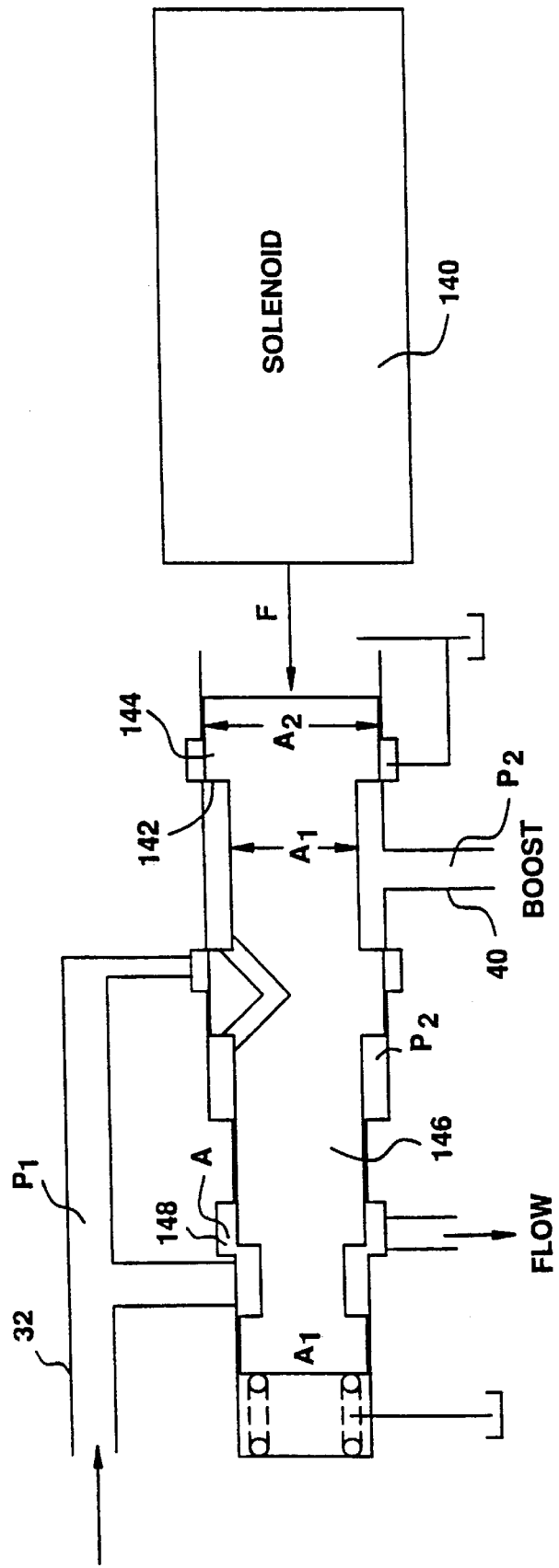
FIG. 7 is a block diagram of a yet further embodiment of the present invention.
Figure 8:
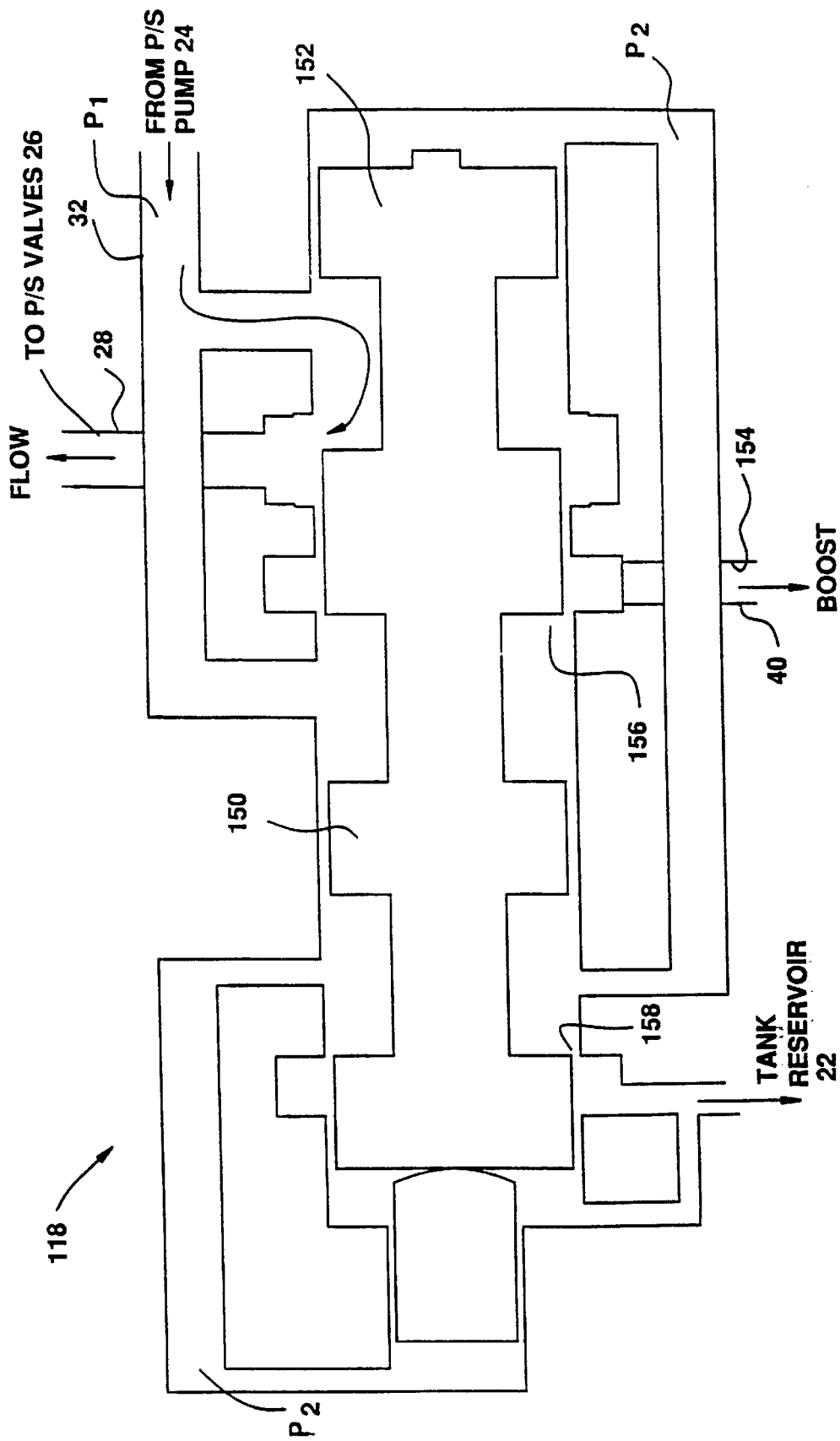
FIG. 8 is a diagram of a yet further embodiment of the present invention.

FIGS. 6 through 8 schematically illustrate alternate embodiments of the brake system 10 illustrated in FIG. 1, in which the functions of the boost pressure control valve 34 and the back pressure valve 30 are combined in a single valve, indicated generally at 118, which is located in the power steering system 12 downstream of the pump 24 and upstream of the power steering valves 26. The embodiments of the valve 118 illustrated in FIGS. 6 through 8 control brake boost with solenoid forces. The boost pressure may be taken from the power steering system 12, or any other available hydraulic power source. If the power steering system 12 is used, the boost pressure used is not, additive to the power steering system pressure.

Referring now to FIG. 6, the embodiment of the valve 118 shown therein has a plunger 122 and a spool and 124. A solenoid 126 exerts a force F on the plunger 122 when the solenoid is energized, which tends to move the plunger 122 rightward, away from the solenoid 126. The solenoid force F is balanced by boost pressure P2 acting through a first fluid conduit 128 on the relatively small diameter left end face of the plunger 122, and through a second fluid conduit 130 on the relatively large diameter right end face of the spool 124, thus exerting a net force to the left in proportion to the boost pressure. The difference in the areas of the left end face of the spool 122 and the right end face of the spool 124 is chosen so that the available solenoid force can balance the required boost pressure P2. If there is insufficient pressure from the power steering pump 24 available at the port P1, the solenoid 126 will move the spools 122 and 124 so that the land 132 on the spool 124 restricts fluid flow at a point 134 to increase the pressure at port P1 and decreasing the restriction at point 136 until the boost pressure P2 balances the force F exerted by the solenoid 126.

The pressure is ported within the valve 118 so that the spool can be made as two separate parts 122 and 124. Thus the concentricity tolerances are less critical than if a single long spool were used.

In the embodiment of the valve 118 illustrated in FIG. 7, the force F exerted by the solenoid 140 is balanced by boost pressure P2 acting on the annular area 142 at the step 144 of the spool 146. The force exerted by the boost pressure P2 is equal to the product of the boost pressure P2 and the difference between the area of the spool 146 through the section marked A1 and the area of the spool 146 section marked A2 (i.e., the area of the annular area 142).

If there is insufficient boost pressure P2 to balance the force F, the spool will move leftward (as viewed in FIG. 7) under the influence of the solenoid force F until the flow restriction at a point 148 causes the pump 24 discharge pressure seen at the port P1 to increase and raise the boost pressure P2 to balance the solenoid force F. The annular area 142 is made so that the solenoid force F available will create the maximum boost pressure needed.

The embodiment of the valve 118 illustrated in FIG. 8 is similar to that illustrated in FIG. 6, but has an extra section 150 in the spool 152 so that the fluid metering to the boost pressure port 154 through the point 156, and the fluid metering from the boost pressure port 154 to the reservoir 22 through the point 158 flows over the spool 152 so that viscous drag opposes closing of the orifices at the points 156 and 158.

Figure 10A:
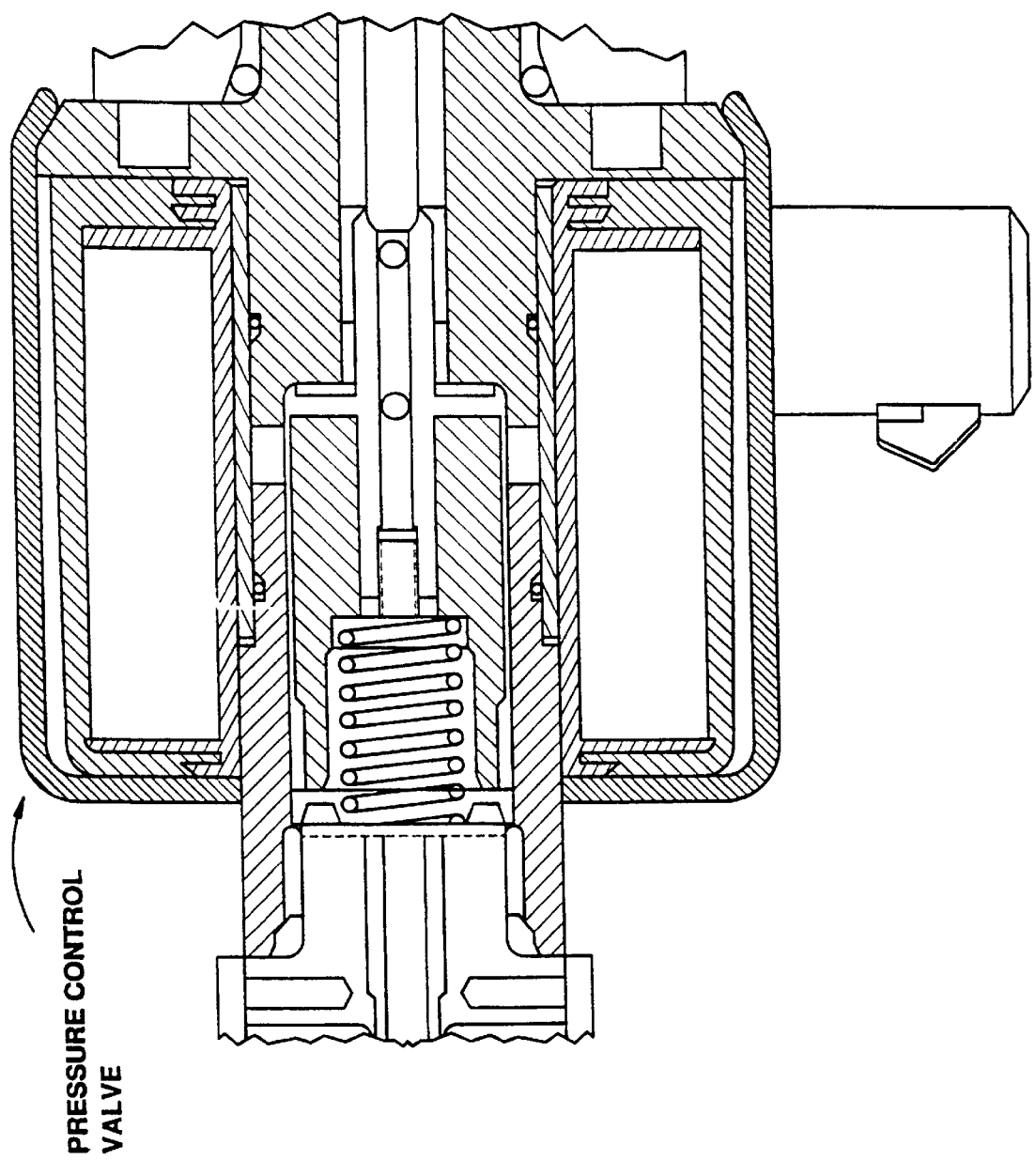
FIG. 10 is a cross sectional view of a pressure control valve and back pressure valve which may be used in a preferred embodiment of the present invention.

FIG. 10 is a cross sectional view of a pressure control valve and back pressure valve which may be used in a preferred embodiment of the invention.

Figure 11:
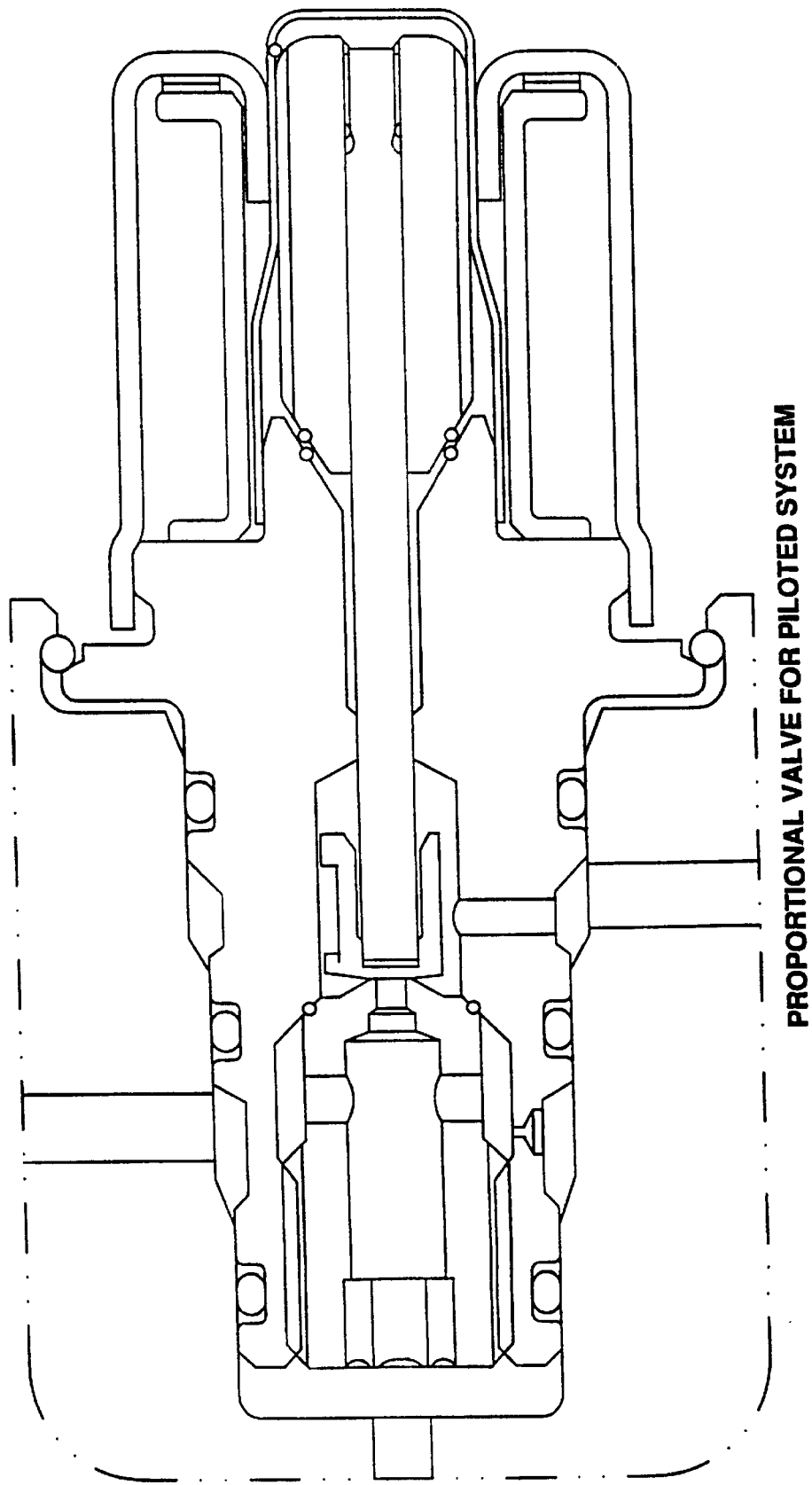
FIG. 11 is a cross sectional view of a proportional solenoid valve which may be used in a preferred embodiment of the present invention.

FIG. 11 is a cross sectional view of a proportional solenoid valve that may be used to implement the valve of FIG. 9 in a preferred embodiment of the invention.

Figure 12:
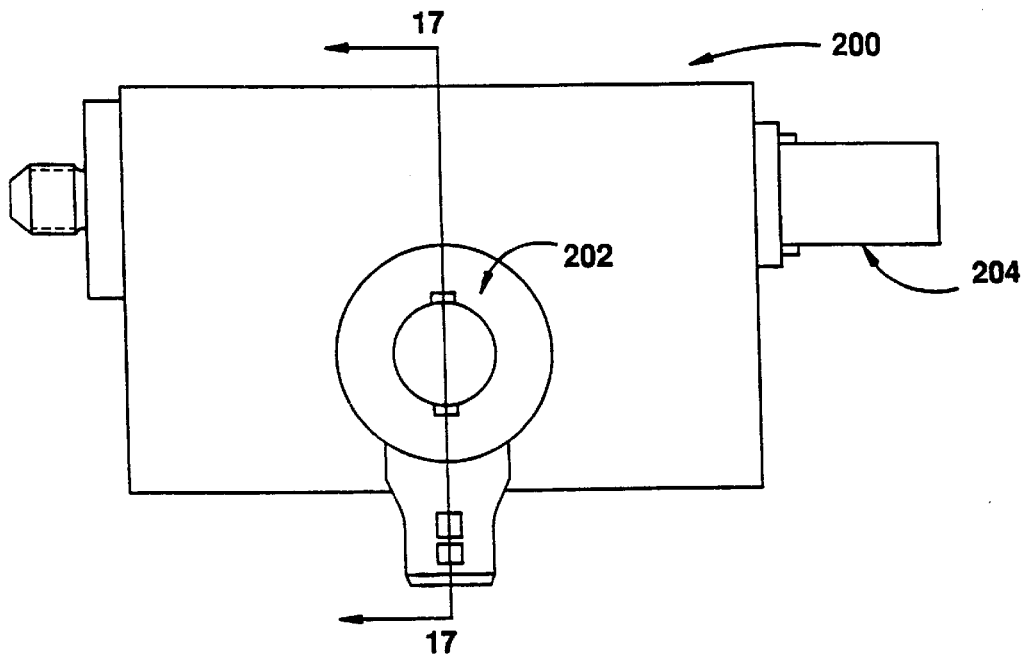
FIG. 12 is a front view of one embodiment of the present invention.
Figure 13:
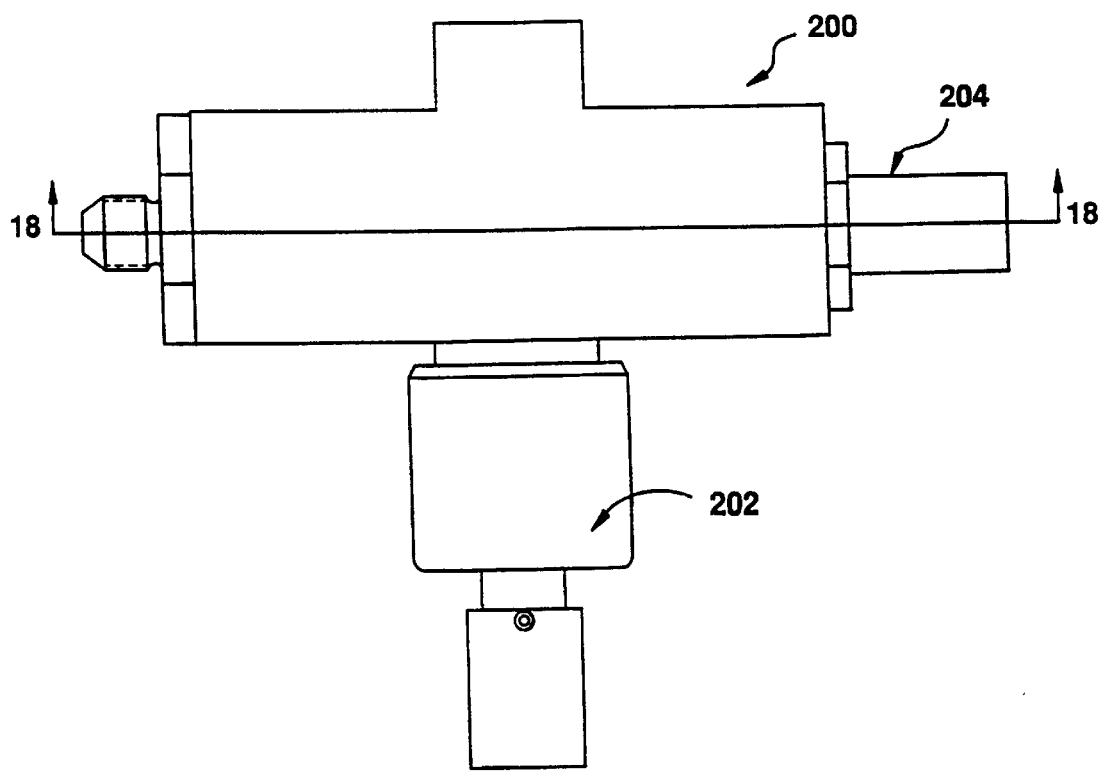
FIG. 13 is a top view of the housing illustrated in FIG. 12.
Figure 14:
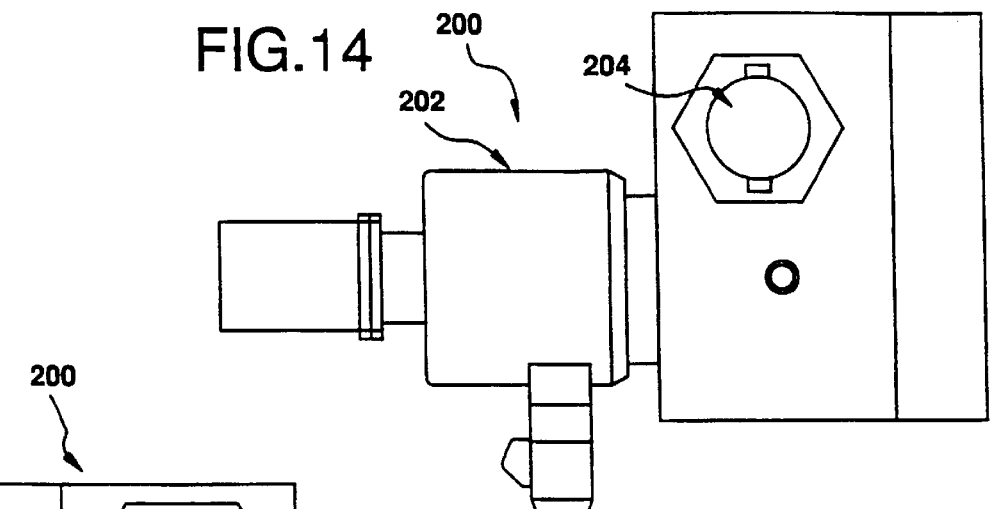
FIG. 14 is a right side view of the embodiment shown in FIG. 12.
Figure 15:
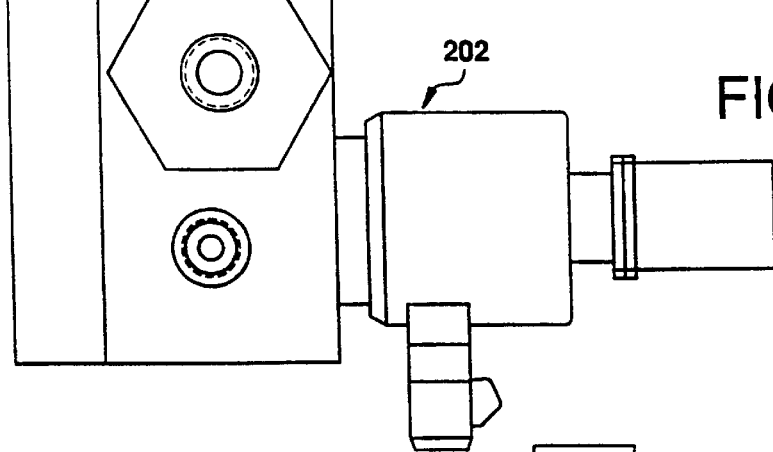
FIG. 15 is a left side view of the embodiment shown in FIG. 12.
Figure 16:
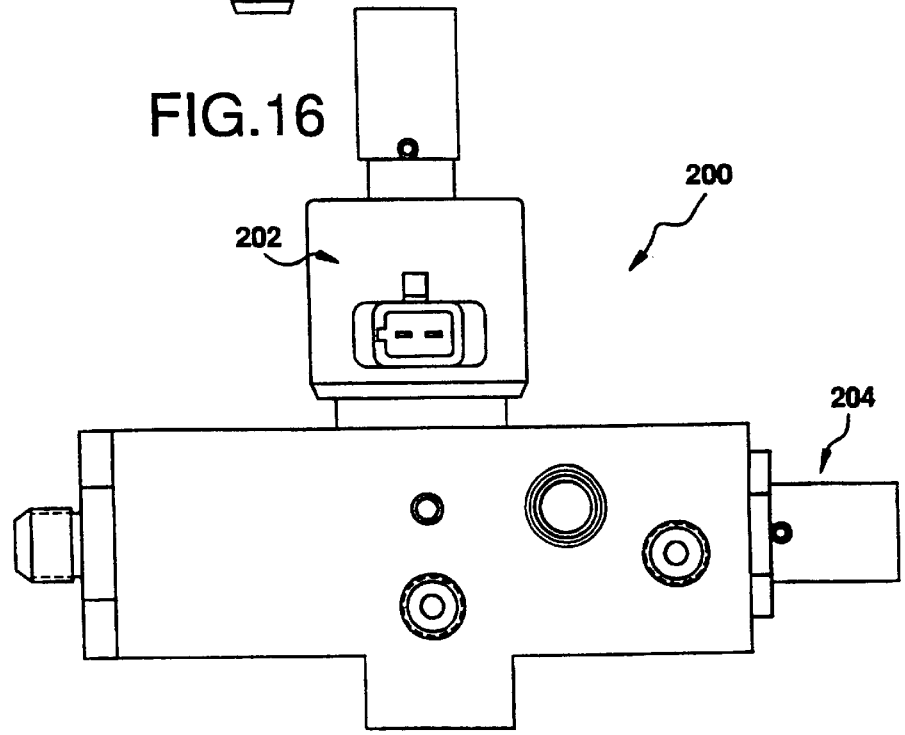
FIG. 16 is a bottom view of the embodiment illustrated in FIG. 12.
Figure 17:
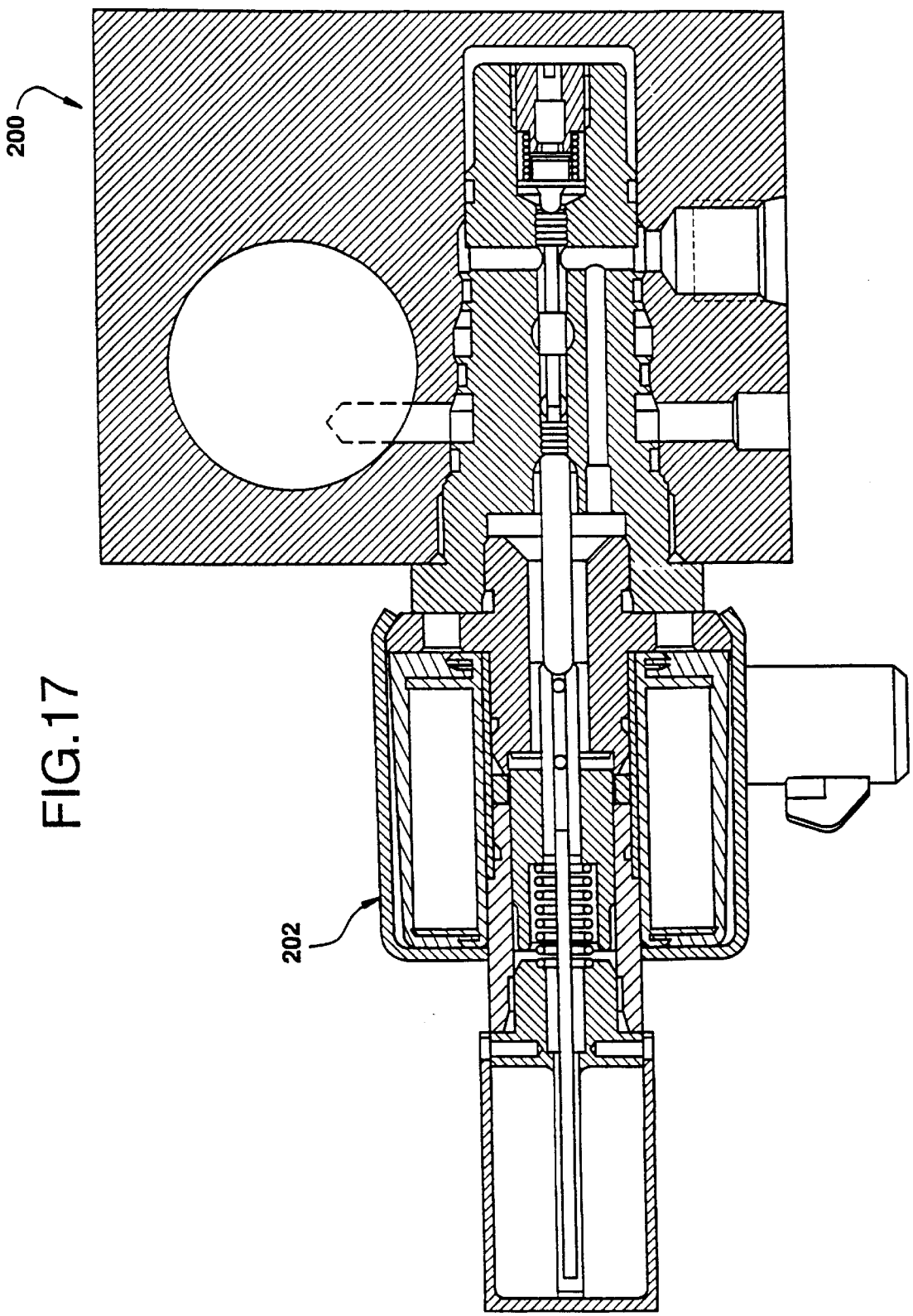
FIG. 17 is a sectional view of the housing 200 taken along the lines 17—17 of FIG. 12.
Figure 18:
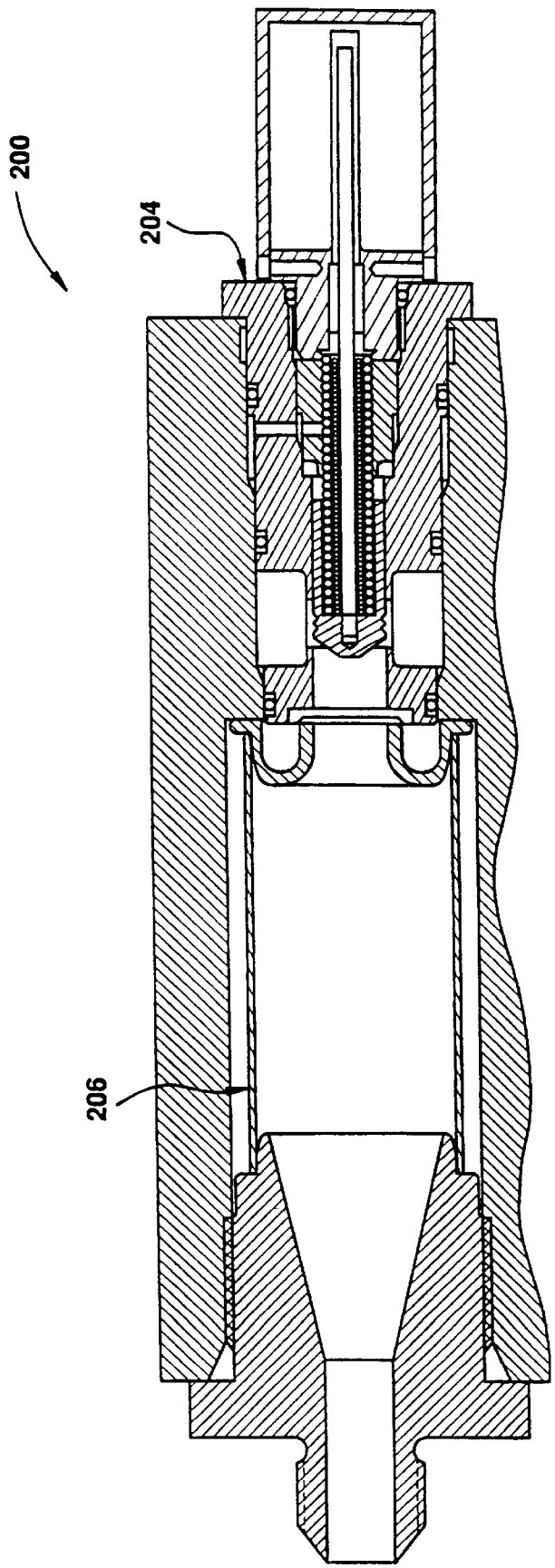
FIG. 18 is a sectional view of the housing 200 taken along the lines 18—18 of FIG. 13.

FIGS. 12 through 18 illustrate a housing, indicated generally at 200, which houses a pressure control valve 202, back pressure valve 204, and a filter 206. FIGS. 12, 13, 14, 15, and 16 are front, top, right side, left side, and bottom elevational views, respectively, of the housing 200. FIG. 17 is a sectional view of the housing 200 taken along lines 17—17 of FIG. 12, showing the pressure control valve 202. FIG. 18 is a sectional view of the housing 200 taken along lines 18—18, showing the back pressure valve 204 and the filter 206.

Figure 19:
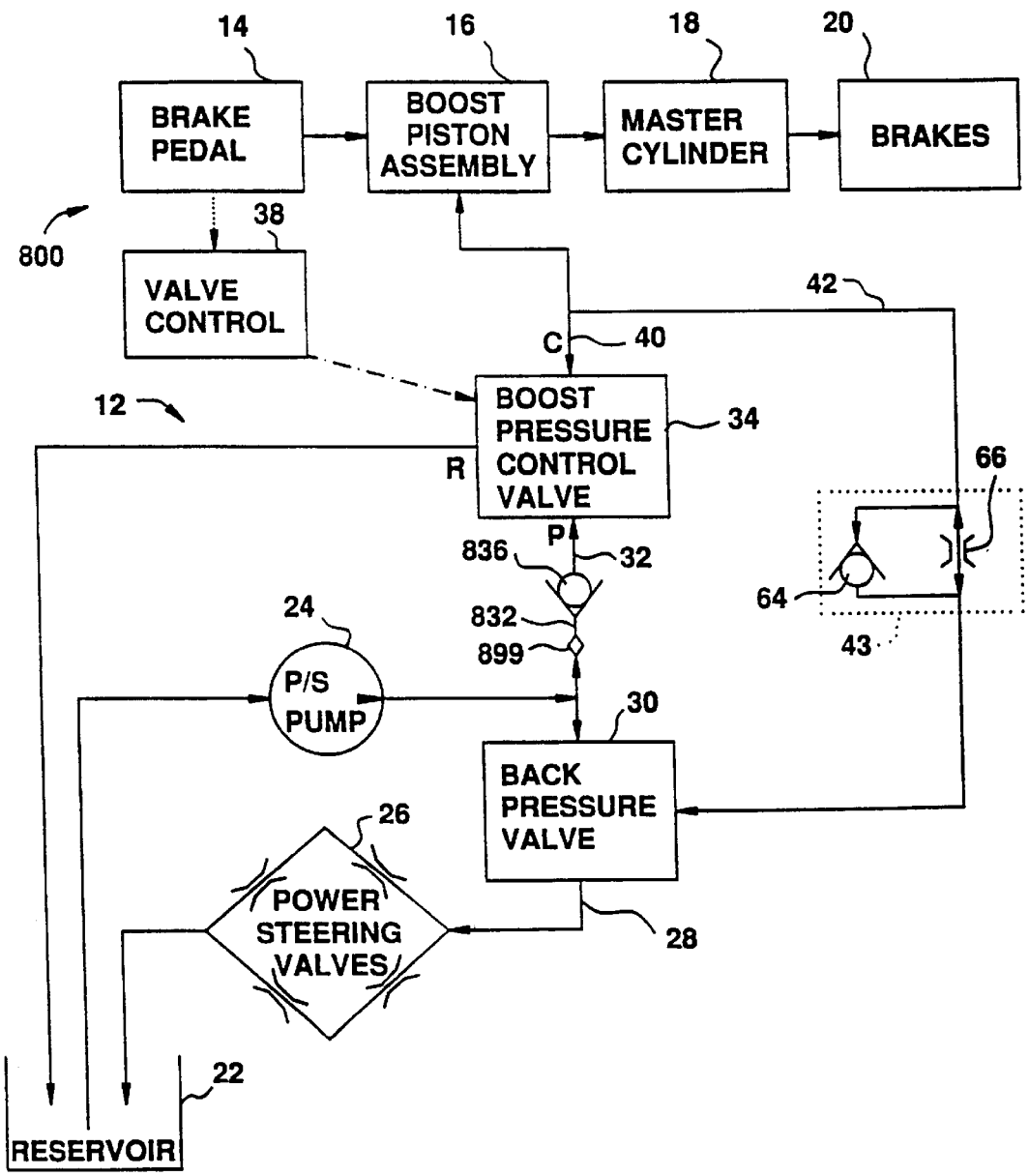
FIG. 19 is a schematic view of an alternate embodiment of a brake system 800.

FIG. 19 is a schematic view of an alternate embodiment of a brake system 800, which is similar to the brake system 10 of FIG. 1, with the exception that the fluid conduit 32 communicates within a fluid conduit 832. Located within the fluid conduit 832 is a check valve 836 and a filter 899. The check valve 836 has a similar function to the check valve 36 of FIG. 1.

Figure 20:
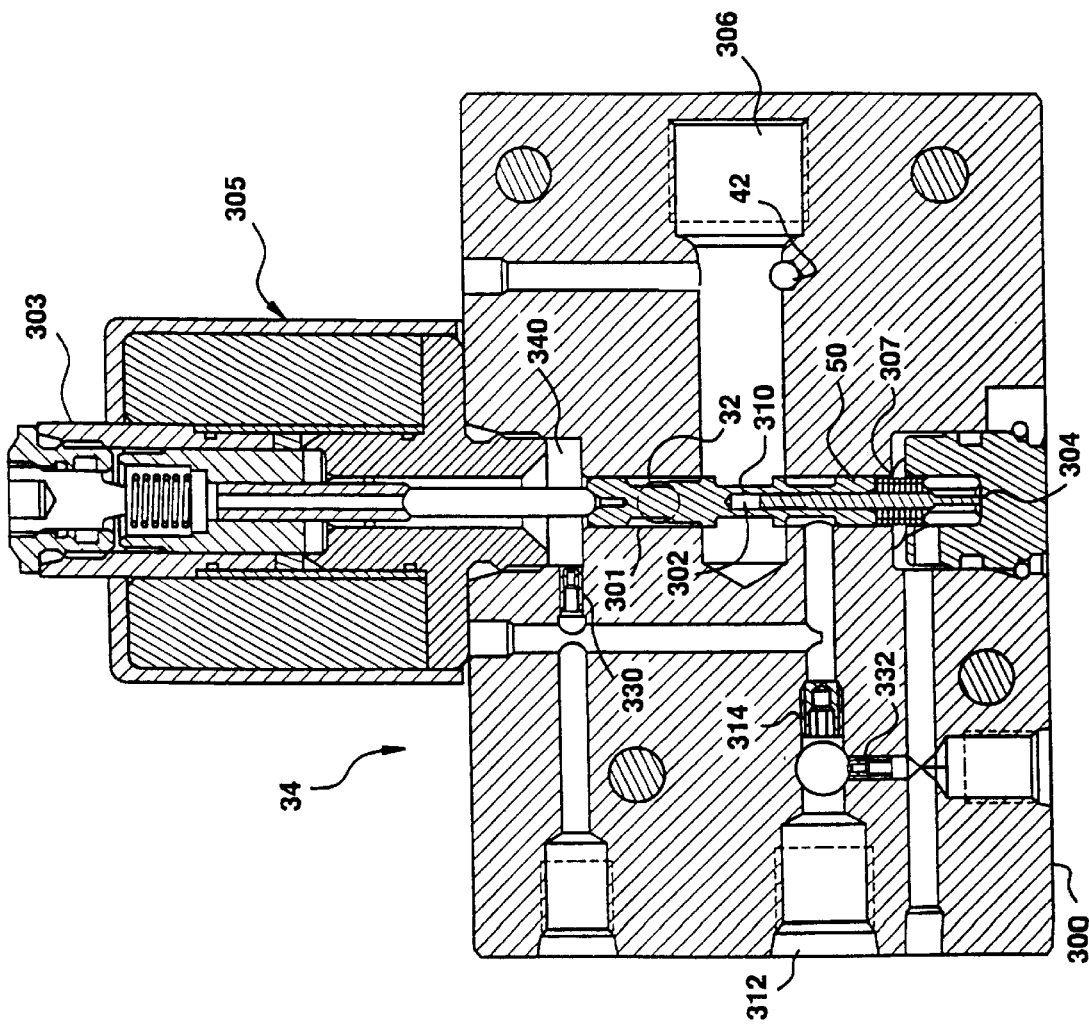
FIG. 20 is a schematic diagram of a further embodiment of the present invention.

FIG. 20 illustrates in schematic form a further embodiment of the boost pressure control valve 34. This boost pressure control valve 34 comprises a valve housing 300 which defines a plurality of ports. A spool 50 is disposed within a chamber 301 in the housing and is movable relative to the housing 300. The spool 50 is operative to selectively direct pressurized hydraulic fluid from the discharge header to the boost piston assembly (not shown). The port for the discharge header 32 is shown in dashed lines on the spool 50. The spool 50 includes an axially disposed hollow channel 302 formed therein at one end thereof. The spool 50 is disposed within the housing 300 and a pin 304 is inserted into the chamber 302 for a part of the length of the chamber 302. One end of the pin 304 is in contact with the housing 300 and the other end of the pin 304 is inserted into channel 302. An assembly 303 is connected to apply a bias force pushing the spool 50 down onto the pin 304. Likewise, a biasing assembly 307 is disposed to apply a biasing force on the spool 50 pushing upward. Additionally, a solenoid 305 is positioned to move the spool 50 up or down in accordance with a control signal.

Hydraulic pressure is applied from the boost pressure control valve 34 to the boost piston assembly 16 (shown in FIG. 1) by means of the port 306 to boost conduit 40. The pressure being applied via boost conduit 40 to the boost piston assembly 16 feeds back through an opening 310 in the spool 50 to communicate with the channel 302 in spool 50. Accordingly, the pressure exiting the port 306 to the conduit 40 also exerts a feedback pressure through the hole 310 to the channel 302 to push against the spool 50 and to oppose the biasing force exerted by the assembly 303. Thus, the position of the spool 50 relative to the ports in channel 301 is determined by the value of the hydraulic pressure in the port 306, the resultant bias force applied by the opposing forces from the biasing assembly 303 and the biasing assembly 307, and the force applied by the solenoid 305.

The biasing assembly 303 may be conveniently implemented in a number of different configurations. For example, FIG. 20 shows a biasing assembly 303 implemented using a mechanical bias spring positioned to impose a force downward onto the spool 50. Likewise, the biasing assembly 307 could be implemented using a mechanical bias spring positioned to impose a force upwardly on the spool 50. Alternatively, the biasing assemblies 303 and 307 could be implemented by an electronic configuration.

A port 312 is shown in FIG. 20 to connect to the venting line R in FIG. 1. An orifice 314 may be utilized in the port 312, as shown in the figure, in order to provide a restriction on fluid flow from the spool 50 to the vent line R and the tank, to thereby build a slight pressure in a chamber 340 formed above the spool which helps to stabilize and dampen the motion of the spool 50 as fluid flows from port 306 to port 312. Note that orifices 330 and 332 may also be utilized to provide a further dampening of spool motion. Various other access holes and bleeder holes are shown in the drawing but are not discussed.

An embodiment of a vehicle hydraulic system which utilizes the boost pressure control valve shown in FIG. 20 would comprise a pressure supply conduit 32 for supplying pressurized hydraulic fluid; a vehicle braking system having a hydraulically operated boost piston assembly 16 (shown in FIG. 1) for supplementing a force exerted by a vehicle operator to operate brakes of the vehicle braking system; and the boost pressure control valve 34 of FIG. 20 responsive to an input signal from the vehicle operator for selectively directing pressurized hydraulic fluid from the pressure supply conduit 32 via a boost pressure conduit 40 to the boost piston assembly 16 and venting hydraulic fluid from the boost piston assembly 16. The boost pressure control valve 34, in accordance with FIG. 20, would comprise the housing 300 with the chamber 301 therein and including the plurality of ports connecting to openings at different locations into the chamber 301. The boost pressure control valve further includes a spool 50 movable within the chamber 301 for selectively directing pressurized hydraulic fluid through at least a first one of the plurality of ports from the pressure supply conduit 32 to the boost pressure conduit 40 and venting hydraulic fluid from the boost piston assembly 16 via the boost pressure conduit 40 to port 312. This spool 50 further includes a mechanism for automatically adjusting the position of the spool relative to the openings in the chamber 301 in accordance with the value of the hydraulic pressure in the boost pressure conduit 40.

In a preferred embodiment, the spool 50 further comprises an internal channel 302 therein opening at one end to the housing 300, and means 310 for connecting the first one of the ports 306 that connects to the boost pressure conduit 40 to the channel 302 to pressurize the channel to thereby oppose the force of the solenoid 305. In a preferred embodiment, the housing includes a pin 304 extending into the chamber 301 and position to extend into the internal channel 302 in the spool 50.

Figure 21A:
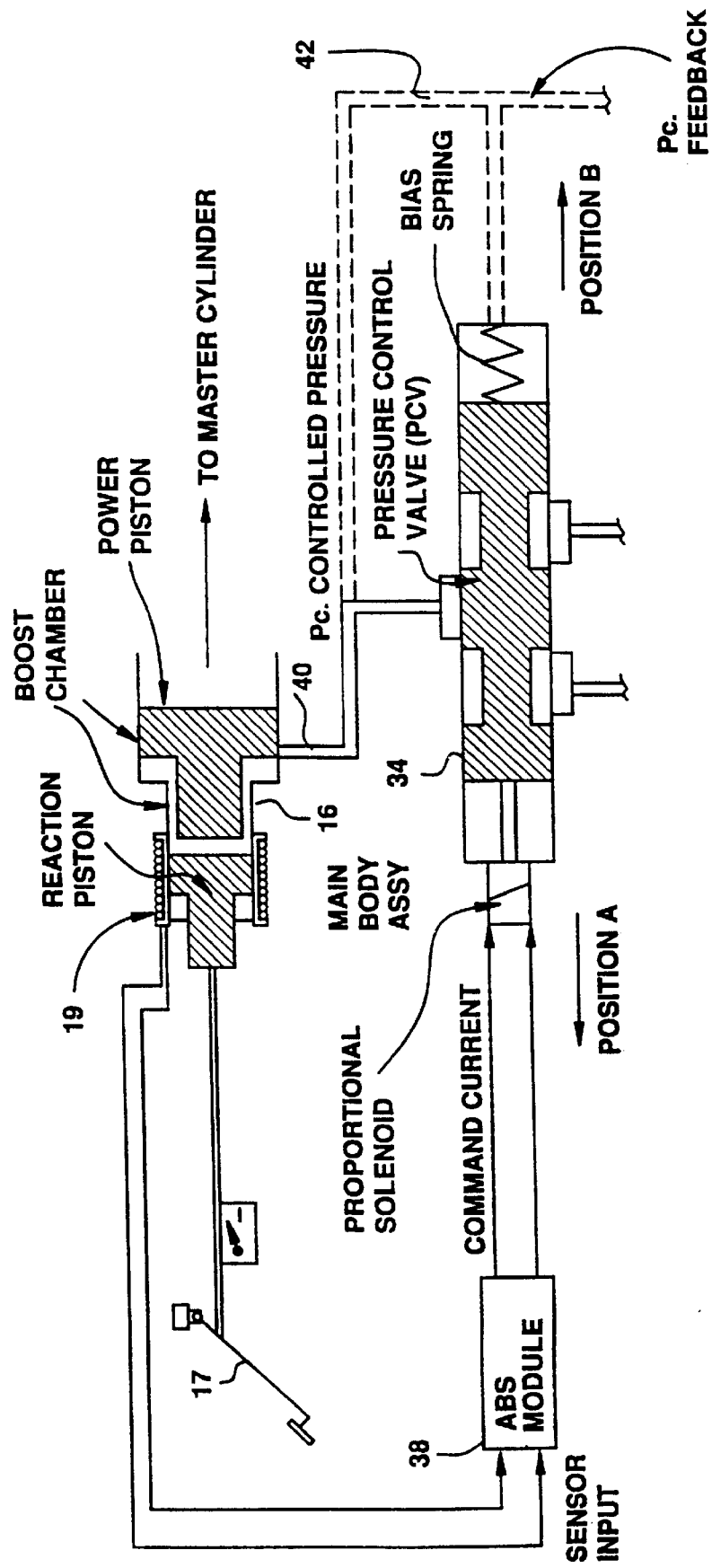
FIG. 21 is a schematic block diagram of a yet further embodiment of the present invention.
Figure 21B:
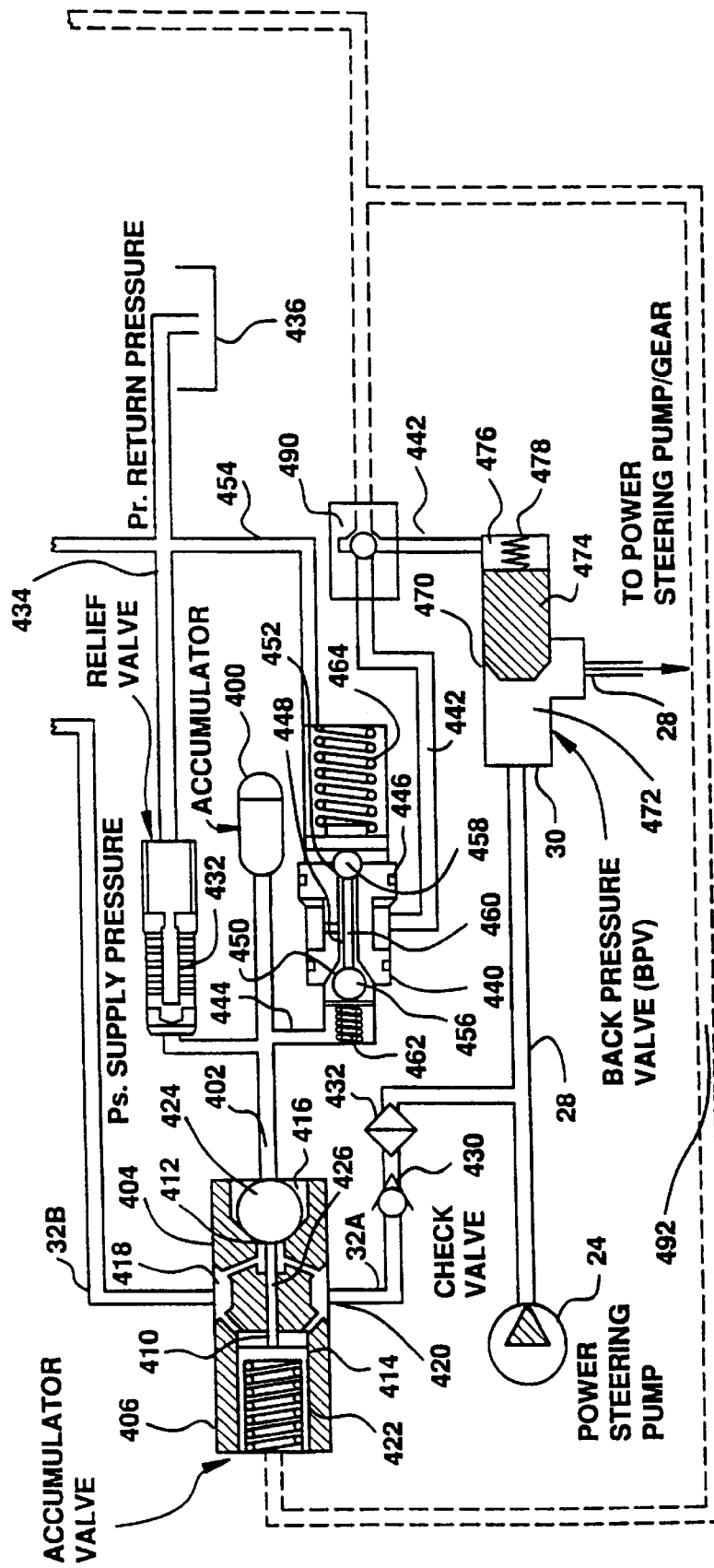

Referring now to FIG. 21, there is shown a yet further embodiment of the present invention which utilizes an accumulator for pressurizing a pressure is supply line 32 when the difference in pressure between conduits. 32 and 40 drops below a first predetermined value. The figure also includes a charging valve assembly connected to the accumulator to cause the accumulator to be automatically charged when hydraulic pressure representative of the pressure in the accumulator drops below a second predetermined value.

Referring more specifically to FIG. 21, there is shown a boost piston assembly 16 for applying supplementary pressure to a master cylinder (not shown). This boost piston assembly 16 is shown as being operatively connected to a brake pedal 17. A travel sensor 19 generates a signal indicative of the travel of the brake pedal. This signal from travel sensor 19 is applied to a module 38 for controlling the position of a boost pressure control valve 34. The boost pressure control valve 34 is responsive to this input signal from the module 38 for directing pressurized hydraulic fluid to the boost piston assembly 16 and venting hydraulic fluid from the boost piston assembly to a reservoir. A pressure source 24 provides pressurized hydraulic fluid via the fluid conduits 32A and 32B to the boost pressure control valve 34. A back pressure valve 30 is connected to the pressure source 24, which may be implemented by a power steering pump 24, in a preferred embodiment.

Within the context of the foregoing structure of FIG. 21, there is provided an accumulator 400 hydraulically connected via a hydraulic conduit 402 to the pressure supply conduit 32. The purpose of the accumulator 400 is to apply a charge of pressure to the hydraulic pressure supply conduit 32 when pressure in conduit 32 drops below a first predetermined value. The pressure charge from the accumulator 400 is applied to the pressure supply conduit 32 via an accumulator valve 404 which is hydraulically connected to the pressure supply conduit 32.

The accumulator valve 404 may take a variety of different configurations. By way of example, but not by way of limitation, the accumulator valve 404 may comprise an accumulator valve body 406 with a channel 408 extending therethrough. The channel 408 has a first opening 410 and a second opening 412 at the ends thereof. There is a first chamber 414 at the first opening 410 of the channel 408, and a second chamber 416 at the second opening 412 of the channel 408. The second chamber 416 is hydraulically connected to the accumulator 400 via the conduit 402. The channel 408 is also hydraulically connected via the ports 418 and 420 to the pressure supply conduit 32.

A first device 422, illustrated in the figure as a piston 422, is disposed in the first chamber 414 and biased so as to open 412 with rod 426. A closure device 424, illustrated in the figure as a ball 424, is disposed in the second chamber and is connected to the piston 422 via a rod 426 which extends through the channel and which is longer than the channel 408 but smaller in cross-section than the channel 408. The biasing of the piston 422 may be accomplished using any of a variety of different techniques. Conveniently, the biasing for the piston 422 may be accomplished by means of a spring. Note that the closure devices may be implemented by structures other than balls or pistons.

Pressure feedback is also provided via a conduit 492 to the accumulator valve 404 to provide the boost pressure from the feedback conduit 42 to the piston chamber for the piston 422 in the accumulator valve 404. Note that this feedback pressure on the conduit 492 will also assist in unseating the ball 424 when there is a drop in the hydraulic pressure in the conduit 32A due to a failure in the pump 24 or for some other reason.

In operation, pressure from the pressure source pump 24 is applied in conduit 32A to the port 420. This hydraulic pressure from the port 420 is applied to the chamber 414 to push the piston 422 to the left in opposition to the mechanical biasing provided by the spring operating on the piston 422. This will allow the rod 426 to move to the left in the Figure, and allow pressure on the ball 424 to make the ball 424 to seat in the opening 412 for the channel 408. Thus, during normal operation by the pressure pump 24, the conduit 32A is appropriately hydraulically pressurized and the piston 422 is moved to the left to cause the ball 424 to seat in the opening 412 to thereby prevent the pressure charge from the line 402 from the accumulator 400 to be applied to the line 32.

When there has been a failure of the pump 24, or if for some other reason the hydraulic pressure of the conduit 32A drops below a predetermined value, then there will no longer be sufficient hydraulic pressure force opposing the mechanical biasing of the spring within the piston 422. Accordingly, the mechanical bias on the piston 422 will cause the piston to move to the right. This movement of the piston 422 to the right causes, via the rod 426, the ball 424 to unseat from the opening 412 and move to the right. Accordingly, a hydraulic pressure charge from the line 402 is applied through the channel 408 of the valve 404 to the line 32B.

Note that a check valve 430 is provided in the line 32A to insure that pressure in the line 32B and the hydraulic pressure charge from the conduit 402 is not lost through line 32A upon a failure in the system. A filter 432 mat also be conveniently provided in the line 32A.

Additionally, a pressure relief valve 432 may be hydraulically connected to the conduit 402 to vent any overpressure on the conduit 402. The pressure relief valve 432 is connected via a conduit 434 to a pressure return 436.

The embodiment of FIG. 21 further includes a charging valve assembly to cause the accumulator to be automatically charged when hydraulic pressure representative of pressure in the accumulator 400 drops below a second predetermined value.

The charging valve assembly comprises a charging valve 440 hydraulically connected to the back pressure valve 30 via a conduit 442. The accumulator valve 440 is hydraulically connected to the accumulator 400 via a hydraulic conduit 444. There are a variety of different electrical and mechanical actuated valve configurations which may be utilized to implement the charging valve 440. In the embodiment shown in FIG. 21, the charging valve 440 comprises a charging valve body 446 with a channel 448 formed therein and ending in a first opening 450 and a second opening 452 at opposite ends of the channel. The first opening is hydraulically connected to the conduit 444, which in turn, is connected via the conduit 402 to the accumulator 400. The second opening is hydraulically connected for venting via the hydraulic conduit 454 which connects to the pressure return 436.

A first closure device, illustrated in the figure as a ball 456, is biased to seat in the first opening 450. A second closure devices, illustrated in the figure as a ball 458, is biased to seat in the second opening 452. Note again that the closure device may be implemented by a variety of structures including balls and pistons. The first and second balls 456 and 458 are in contact with either end of a rod 460, which extends through the channel 448 and which is longer than the channel 448, but is smaller in cross-section than the channel 448. A variety of mechanisms may be utilized to bias the first and second balls 456 and 458. In the embodiment shown in FIG. 21, the ball 456 is biased by a spring 462, which biases the ball 456 to seat in the opening 450. Likewise, a spring 464 is provided to bias the ball 458 to seat in the opening 452.

It is preferred that the balls 456 and 458 have slightly different diameters, with the diameter for the ball 456 being larger than the diameter for the ball 458.

The back pressure valve 30 in FIG. 21 may be implemented by disposing the back pressure valve in series with, but upstream, of the vehicle power steering assembly. The connection of the back pressure valve 30 to the vehicle power steering assembly is via the conduit 28. The back pressure valve 30 comprises a valve housing 470 with the hydraulic fluid from the line 28 flowing in a first channel 472 therethrough. The back pressure valve 30 further includes a piston 474 which forms a control chamber 476 with housing 470. The piston 474 is biased by a biasing mechanism 478 to extend into the channel 472 to constrict the flow therein and exert a back pressure. The back pressure generated from the back pressure valve 30 depends on the pressure on the piston 474 from fluid in chamber 476, and on biasing structure 478. For a typical vehicle installation, the normal pressure created by the biasing structure 478, which may simply be a mechanical spring, is from 50 to 100 PSID (except when the accumulator is being charged).

As can be seen from the figure, the control chamber 476 communicates through the hydraulic conduit 442 to the channel 448 via a center port of the charging valve 440. The pressure in the control chamber 476 is designed to toggle between the controlled pressure in conduit 42 during an uncharging mode, and the accumulator pressure during an accumulator charging mode via check valve 490. Both of these pressures could be, at times, the reservoir pressure.

Note that hydraulic conduits are included to provide a pressure feedback via the conduit 42 from the boost pressure conduit 40. This pressure feedback is provided to the boost pressure control valve 34 and may also be provided to the conduit 442. At the intersection of the conduit 42 with the conduit 442, a control ball 490 is disposed. It should be noted that the ball 490 floats freely in the junction of the conduits 442 and 42 and allows the back pressure valve to reference either the pressure from the boost pressure line 40 or the pressure in the conduit 442.

In operation during a charging mode, when the accumulator 400 has a pressure below a predetermined value, then the hydraulic pressure in the conduit 444, which pressure is applied against the ball 456, is decreased relative to a non-charging mode. In this situation, the loading force of the mechanical biasing spring 464 is sufficient to exceed both the force applied by the spring 462 and the hydraulic pressure (which is low during a charging mode) from the conduit 444 applied to the right to seat the check ball 456. Accordingly, the ball 458 is pushed into its seat 452 and the ball 456 is unseated by rod 460 thereby making a hydraulic connection between the conduit 444 and the conduit 442 which leads to the control chamber 476. Note that the check ball 456 with the larger diameter is held open by the push rod 460 when the ball 458 is seated. With this operation, accumulator hydraulic pressure communicates through the conduit 444 and the conduit 442 to the control chamber 476, which acts with the mechanical biasing spring 478 to move the piston 474 to a more closed position to thereby constrict the hydraulic fluid flow through the chamber 472 in the back pressure valve 30. The operation of this piston 474 constricting the chamber 472 causes back pressure to be created upstream for purposes of charging the accumulator 400 to a higher pressure. Specifically, this higher pressure on the conduit 28 will be communicated to the conduit 32A and into the accumulator valve 406 to thereby blow off the ball 424 to thereby charge the accumulator to a higher pressure. Note that the low pressure in the conduit 402 facilitates this unseating of the ball 424.

As the accumulator pressure reaches a level where the pressure force acting via the conduit 444 on the ball 456 and ball 458, in combination with the mechanical biasing of the spring 462, becomes greater than the loading force from the biasing spring 464, then the ball 458 is pushed to the right to open the seat 452. With seat 452 open, pressure in the channel 448 drops to the reservoir pressure via the conduit 454. Since the ball 456 has a larger seating area and a larger ball diameter than the ball 458, the seating pressure is significantly higher than the spring loading force from the mechanical biasing spring 464 at that instant. With the ball 456 closing seat 450, the pressure built up in accumulator 400 is trapped. Accordingly, pressurized fluid has been stored in the accumulator 400 to be available for brake actuation on command of the brake boost system.

With the unseating of the ball 458, the conduit 442 is now hydraulically connected via the conduit 454 to the pressure return 436. Accordingly, the control chamber 476 is immediately vented via the conduit 442, the accumulator control valve 440, and the conduit 454 at the pressure return 436, which may be at atmospheric pressure. With the venting of the control chamber 476, the piston 474 in the back pressure valve 30 moves to the right and the back pressure valve 30 is returned to its uncharging state.

As the pressure in the accumulator 400 decays, either due to leakage or on command of the brake boost system, the loading spring force from the mechanical bias spring 464 overcomes the bias from the spring 462 and the lowered pressure force from the conduit 444 applied to the ball 456. Thus, the ball 458 is again seated in the opening 452 and the ball 456 is unseated. Accordingly, the pressure from the accumulator 400 via the conduit 444 is connected through the conduit 442 to the control chamber 476, as noted previously. The back pressure valve 30 is once again activated and the charging sequence repeats. Depending on pump flow rates, the charging sequence typically takes approximately one second for a standard installation.

Note that the cut-off charging pressure and the cut-in pressure are determined by the relative seating areas of the balls 456 and 458, as well as the loading on the spring 464 relative to the loading on the spring 462. In an alternative embodiment, the spring 462 may be omitted. The cut-off pressure should be set below the pump relief pressure at all times. The cut-in pressure can be set as required for the optimal operation of the brake boost system. Note that the accumulator 400 can also be charged by the back pressure created by the power steering assembly if the back pressure generated thereby is higher than the internal pressure of the accumulator 400. Note that the charging sequence takes less than a second to accomplish and the back pressure valve is never fully closed, so that normal steering and braking operations are not interfered with.

It should be noted in particular that the embodiments of FIGS. 1 and 2 provide the advantage of a low cost design which can use one three-way spool valve for the boost control valve in which the control port is drilled and reamed with matching lands ground onto the valve spool with no or little milling required.

Since separate back pressure and boost pressure control valves are used, the back pressure valve can be of adequately large size to generate an acceptably low back pressure (when brake boost and power steering are not required), while the boost pressure control valve can be relatively small since only small flows to the boost piston assembly are required in comparison to flow required for power steering.

The size of the boost pressure control valve can also be limited due to the relatively small travel of the spool thereof. Balance of the spool always will occur within the "blocked loads" pressure gain region of the spool. Therefore, flow will be proportional to the excitation current of the solenoid with a simple solenoid design.

The apply rate of boost is relatively constant since the back pressure control valve maintains a constant differential pressure between the pump discharge and the control port of the boost pressure control valve.

Generally, with the embodiments of the present invention the full back pressure from the power steering system can be used to supply boost pressure.

A simple arrangement with a check valve in parallel with an orifice may be used to limit the rate at which the back pressure control valve unloads the pump supplying boost pressure, which may be desirable for traction control.

A simple check valve can be positioned between the pump supplying pressurized fluid and the back pressure valve to maintain pressure in the fluid conduit between the back pressure valve and the boost pressure control valve in the event of pump failure or engine stall.

The design features a hydraulic brake boost control valve that can be electronically controlled. A solenoid operated boost pressure control valve may be used in which forces generated by electrical solenoids are balanced against forces generated by boost pressure.

The principle and mode of operation of this invention have been explained and illustrated in its preferred embodiment. However, it must be understood that this invention may be practiced otherwise than as specifically explained and illustrated without departing from its spirit or scope.

What is claimed:

1. A vehicle hydraulic system comprising:
   a hydraulic fluid reservoir;
   a first fluid conduit in fluid communication with said reservoir and a second fluid conduit;
   a pressure source supplying pressurized hydraulic fluid to said first fluid conduit and to said second fluid conduit;
   a vehicle braking system having a hydraulically operated boost piston assembly for supplementing a force exerted by a vehicle operator to operate brakes of a vehicle braking system, wherein said second fluid conduit is in fluid communication with said boost piston assembly;
   a back pressure valve operative in said first fluid conduit to maintain a desired pressure in said second fluid conduit when the vehicle operator is not operating said vehicle brakes;
   a boost pressure control valve operative in said second fluid conduit for directing pressurized hydraulic fluid therethrough to said boost piston assembly only when said vehicle brakes are operated and for allowing substantially no fluid flow to said boost piston assembly when said vehicle brakes are not operated;
   a third fluid conduit providing fluid communication from said second fluid conduit, at a point between said boost pressure control valve and said boost piston assembly, to said back pressure valve to control the back pressure generated by said back pressure control valve; and
   means disposed in said third fluid conduit to limit a pressure reduction rate in said third fluid conduit.

2. The hydraulic system of claim 1, wherein said boost pressure control valve includes a housing defining a plurality of ports and a spool movable relative to said housing for selectively directing pressurized hydraulic fluid in said second fluid conduit to said boost piston assembly through said ports and venting hydraulic fluid from said boost piston assembly to said reservoir through said ports, said spool moving relative to said housing in response to an input signal.

3. The hydraulic system of claim 2, wherein said input signal to said boost pressure control valve is a pressure signal generated by a pilot valve, which pilot valve selectively applies pressurized hydraulic fluid from said second fluid conduit to a portion of said spool and vents hydraulic fluid from said portion of said spool to said reservoir to cause said spool to move relative to said housing in response to an operator input to said pilot valve.

4. The hydraulic system of claim 2, wherein said input signal to said boost pressure control valve is an electrical signal to a solenoid having an armature operatively coupled to said spool, such that the forces generated by said solenoid are balanced against forces generated by boost pressure.

5. The hydraulic system of claim 1, wherein said back pressure valve comprises a cup shaped piston disposed to move within a valve body.

6. The hydraulic system of claim 1 further comprising a check valve in parallel with an orifice disposed in said third fluid conduit.

7. A vehicle hydraulic system comprising:
   a hydraulic fluid reservoir;
   a first fluid conduit in fluid communication with said reservoir and a second fluid conduit;
   a pressure source supplying pressurized hydraulic fluid to said first fluid conduit and to said second fluid conduit;
   a vehicle braking system having a hydraulically operated boost piston assembly for supplementing a force exerted by a vehicle operator to operate brakes of a vehicle braking system, wherein said second fluid conduit is in fluid communication with said boost piston assembly;
   a back pressure valve operative in said first fluid conduit to maintain a desired pressure in said second fluid conduit when the vehicle operator is not operating said vehicle brakes;
   a boost pressure control valve operative in said second fluid conduit for directing pressurized hydraulic fluid therethrough to said boost piston assembly only when said vehicle brakes are operated and for allowing substantially no fluid flow to said boost piston assembly when said vehicle brakes are not operated;
   an accumulator; and
   an accumulator valve assembly positioned in said second fluid conduit between said pressure source and said boost pressure control valve to hydraulically connect said accumulator to said second fluid conduit when a difference in pressure between pressure applied from said pressure source relative to pressure in said second fluid conduit between said boost pressure control valve and said boost piston assembly drops below a first predetermined value.

8. The hydraulic system of claim 7 further comprising a charging valve assembly in fluid communication with said accumulator to cause said accumulator to be automatically charged when hydraulic pressure representative of pressure in said accumulator drops below a second predetermined value.

9. The hydraulic system of claim 7 further comprising a third fluid conduit providing fluid communication from said second fluid conduit, at a point between said boost pressure control valve and said boost piston assembly, to said back pressure valve to control the back pressure generated by said back pressure control valve.

10. The hydraulic system of claim 9, wherein said back pressure valve comprises a cup shaped piston disposed to move within a valve body.

11. The hydraulic system of claim 7, wherein said boost pressure control valve includes a housing defining a plurality of ports and a spool movable relative to said housing for selectively directing pressurized hydraulic fluid in said second fluid conduit to said boost piston assembly through said ports and venting hydraulic fluid from said boost piston assembly to said reservoir through said ports, said spool moving relative to said housing in response to an input signal.

12. The hydraulic system of claim 11, wherein said input signal to said boost pressure control valve is a pressure signal generated by a pilot valve, which pilot valve selectively applies pressurized hydraulic fluid from said second fluid conduit to a portion of said spool and vents hydraulic fluid from said portion of said spool to said reservoir to cause said spool to move relative to said housing in response to an operator input to said pilot valve.

13. The hydraulic system of claim 11, wherein said input signal to said boost pressure control valve is an electrical signal to a solenoid having an armature operatively coupled to said spool, such that the forces generated by said solenoid are balanced against forces generated by boost pressure.

14. A vehicle hydraulic system comprising:
   a hydraulic fluid reservoir;
   a first fluid conduit in fluid communication with said reservoir and a second fluid conduit;
   a pressure source supplying pressurized hydraulic fluid to said first fluid conduit and to said second fluid conduit;
   a vehicle braking system having a hydraulically operated boost piston assembly for supplementing a force exerted by a vehicle operator to operate brakes of a vehicle braking system, wherein said second fluid conduit is in fluid communication with said boost piston assembly;
   a back pressure valve operative in said first fluid conduit to maintain a desired pressure in said second fluid conduit when the vehicle operator is not operating said vehicle brakes;
   a boost pressure control valve operative in said second fluid conduit for directing pressurized hydraulic fluid therethrough to said boost piston assembly only when said vehicle brakes are operated and for allowing substantially no fluid flow to said boost piston assembly when said vehicle brakes are not operated; and
   wherein said boost pressure control valve comprises:
      a housing defining a plurality of ports;
      a plunger;
      a spool, said plunger and said spool being disposed on an axis and movable within and relative to said housing for selectively directing pressurized hydraulic fluid from said second fluid conduit to said boost piston assembly through said ports and venting hydraulic fluid from said boost piston assembly to said reservoir through said ports, with said plunger having a first axial face to which a hydraulic pressure is applied in a first direction along said axis from a first conduit internal to said boost pressure control valve, and with said spool having a second axial face with a different area than said first axial face and to which a hydraulic pressure is applied in a second direction opposite to said first direction along said axis from a second conduit internal to said boost pressure control valve; and
      a control assembly for exerting a force to cause said plunger and said spool to move in said first direction in accordance with said input signal.

15. The hydraulic system of claim 14 further comprising a third fluid conduit providing fluid communication from said second fluid conduit, at a point between said boost pressure control valve and said boost piston assembly, to said back pressure valve to control the back pressure generated by said back pressure control valve.

16. The hydraulic system of claim 15, wherein said back pressure valve comprises a cup shaped piston disposed to move within a valve body.

17. The hydraulic system of claim 14, wherein said input signal to said boost pressure control valve is an electrical signal to a solenoid having an armature operatively coupled to said spool, such that the forces generated by said solenoid are balanced against forces generated by boost pressure.

* * * * *